United States Patent
Brookfield

(10) Patent No.: US 8,267,351 B2
(45) Date of Patent: Sep. 18, 2012

(54) ROLLER SLOT DOOR MECHANISM

(75) Inventor: Chris Brookfield, Ajax (CA)

(73) Assignee: Messier-Dowty Inc., Ajax (CA)

(*) Notice: Subject to any disclaimer, the term of this patent is extended or adjusted under 35 U.S.C. 154(b) by 288 days.

(21) Appl. No.: 12/630,465

(22) Filed: Dec. 3, 2009

(65) Prior Publication Data
US 2010/0140394 A1 Jun. 10, 2010

Related U.S. Application Data

(60) Provisional application No. 61/193,531, filed on Dec. 5, 2008.

(51) Int. Cl.
*B64C 25/14* (2006.01)
(52) U.S. Cl. ............. 244/102 R; 244/102 A; 244/100 R
(58) Field of Classification Search ............... 244/102 R, 244/129.4, 129.5, 102 A, 100 A, 100 R, 102 SS, 244/102 SL
See application file for complete search history.

(56) References Cited

U.S. PATENT DOCUMENTS

| | | | |
|---|---|---|---|
| 2,452,251 A | 10/1948 | Martin | |
| 2,538,878 A | 1/1951 | Misulis | |
| 3,652,039 A * | 3/1972 | Lucien | 244/102 A |
| 3,669,387 A | 6/1972 | Lucien | |
| 6,027,070 A * | 2/2000 | Zambelli | 244/102 R |
| 6,345,786 B1 * | 2/2002 | Sakurai | 244/102 R |
| 7,331,547 B2 * | 2/2008 | Chicharro Gonzalez | 244/129.5 |
| 7,338,012 B2 | 3/2008 | Rouyre | |

OTHER PUBLICATIONS

International Search Report issued by the Canadian Intellectual Property Office dated Feb. 26, 2010 for corresponding International Application No. PCT/CA2009/001753.
Written Opinion of the International Searching Authority issued by the Canadian Intellectual Property Office dated Feb. 26, 2010 for corresponding International Application No. PCT/CA2009/001753.
International Preliminary Report of Patentability issued by the International Bureau of WIPO dated Jun. 7, 2011 for corresponding International Patent Application No. PCT/CA2009/001753.

* cited by examiner

*Primary Examiner* — Christopher P Ellis
*Assistant Examiner* — Medhat Badawi
(74) *Attorney, Agent, or Firm* — Aaron Edgar; Gowling Lafleur Henderson LLP

(57) ABSTRACT

The present invention provides an aircraft landing bay door mechanism that includes the use of a roller slot mechanism for opening and closing the landing bay door.

20 Claims, 30 Drawing Sheets

AT TRANSITION FROM "MOVEMENT REGION"
TO "DWELL REGION"

LAW OF SINES $$\frac{R}{SIN(\phi_T)} = \frac{X_T}{SIN(\Theta_T)} = \frac{D}{SIN\ 90°}$$

$$\therefore X_T = D * SIN(\Theta_T)$$
$$R = D * SIN\ \phi_T$$

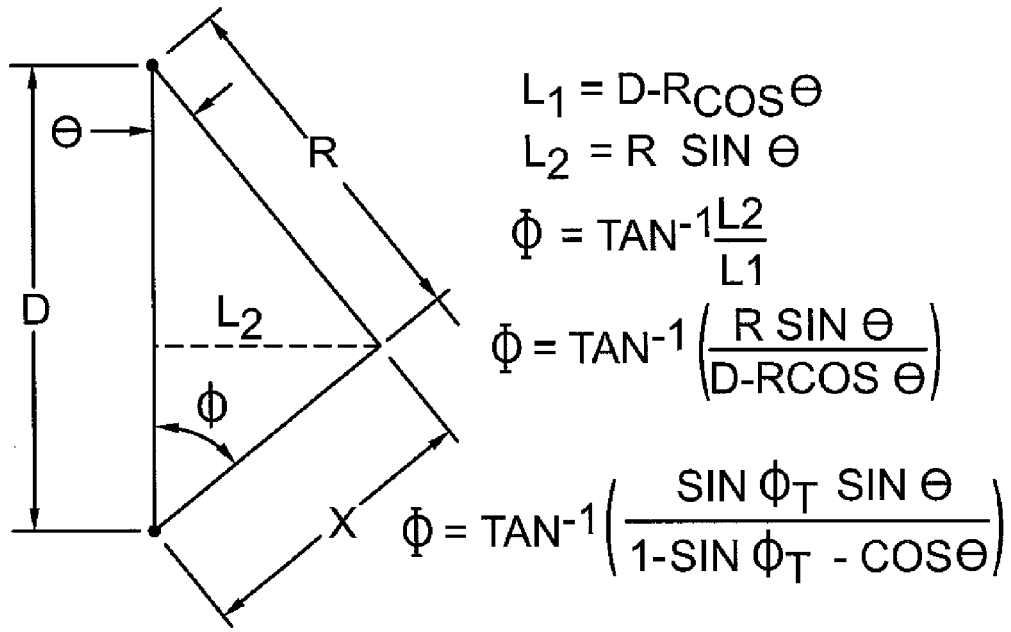

$L_1 = D - R\cos\theta$
$L_2 = R\sin\theta$
$\phi = \tan^{-1}\dfrac{L_2}{L_1}$
$\phi = \tan^{-1}\left(\dfrac{R\sin\theta}{D - R\cos\theta}\right)$
$\phi = \tan^{-1}\left(\dfrac{\sin\phi_T \sin\theta}{1 - \sin\phi_T - \cos\theta}\right)$

OUTPUT CRANK DISPLACEMENT $\phi = \tan^{-1}\left(\dfrac{\sin\phi_T + \sin\theta}{1 - \sin(\theta_T)\cos\theta}\right)$

OUTPUT CRANK VELOCITY $\dot{\phi} = \dot{\theta}\sin\phi_T \left(\dfrac{\cos\theta - \sin\phi_T}{1 + \sin^2\phi_T - 2\sin\phi_T \cos\theta}\right)$

OUTPUT CRANK ACCELERATION $\ddot{\phi} = \dot{\theta}^2 \left(\dfrac{\sin\phi_T \cdot \cos^2\phi_T \cdot \sin\theta}{(1 + \sin^2 - 2\sin\phi_T \cos\theta)^2}\right)$

FIGURE 21B

ROLLER SLOT DOOR MECHANISM

FIELD OF THE INVENTION

The invention relates to a door mechanism for use on aircraft landing gear doors. In particular, the present invention relates to a door mechanism that utilizes a roller slot mechanism.

BACKGROUND OF THE INVENTION

Several different mechanisms are known and used to operate the opening and closing of aircraft landing gear doors. However, most of these mechanisms have disadvantages associated with them because they can affect the overall performance of at least one of the aircraft landing gear doors, the landing gear and the aerodynamics of the aircraft.

Many door mechanisms are based on mechanical linkages that contain revolute and/or spherical joints. Such mechanical devices have the advantage of not including hydraulics which require additional maintenance, not including door proximity sensors and other electronic controls, and not requiring an emergency release system to be incorporated within them. In addition, mechanical linkages generally include fewer components than non-mechanical devices. Fewer components generally translates to a higher reliability for the device.

However, the use of mechanical linkages also includes several disadvantages. The use of such devices can inhibit landing gear extension and retraction due to door air loads since some devices make door closing when the landing gear is up and down quite difficult. In addition, the use of mechanical devices makes it difficult to control kinematics to perform the desired door opening and door closing sequence. The kinematics include such things as the speed of the door opening, the maximum angle the doors open, the timing with respect to how long the doors remain open while the landing gear moves by the doors.

It is therefore desirable to provide a door mechanism that retains the advantages of the mechanical linkages while overcoming some of the inherent kinematic problems.

SUMMARY OF THE INVENTION

The present invention provides a door mechanism, for use on aircraft landing gear bay doors, that provides a controlled opening and closing of the aircraft landing gear bay doors.

The present invention provides a door mechanism that allows for a quick initial opening of the aircraft landing gear doors, followed by an intermediate dwell time where the doors are held substantially stationary, and then a quick closing of the doors once the landing gear is close to the fully extended position.

In one embodiment there is provided an aircraft landing gear door opening mechanism for opening and closing the landing gear bay door comprising a drive rod pivotably coupled at one end to the aircraft landing gear; an input crank pivotably coupled at a first end to the drive rod, at the opposite end of the drive rod from the landing gear; an output crank coupled to the input crank and operable to move relative to the input crank; and a door rod pivotably coupled to the output crank, the door rod further coupled to the landing gear bay door.

In a further embodiment there is provided an aircraft landing gear roller slot mechanism for opening and closing the landing gear bay door comprising a drive rod pivotably coupled at one end to the aircraft landing gear; an input crank pivotably coupled at a first end to the drive rod, at the opposite end of the drive rod from the landing gear, the input crank having a projection extending from a second end; an output crank comprising a slot defined at one end thereof, the slot being configured to receive the projection therein; and a door rod pivotably coupled to the output crank at the opposite end of the output crank to the slot, the door rod further coupled to the landing gear bay door. Extension of the landing gear causes the drive rod to move which initiates rotation of the input crank. Rotation of the input crank moves the projection within the slot located on the output crank. This movement in turn initiates rotation of the output crank which applies a force on the door rod which pushes down against the landing gear bay door initiating the opening of the door.

There is also provided an apparatus for opening and closing a door of a landing gear bay in an aircraft comprising: mechanical coupling means coupling the landing gear and the door, the coupling means comprising: an input crank coupled to the landing gear bay at least one input crank pivot point and further coupled to the landing gear; an output crank coupled to the landing gear bay at least one pivot point and further coupled to the landing gear bay door, the input and output cranks configured so that pivotal movement of one of the input and output cranks about its respective pivot point causes the other of the input and output cranks to pivot about its respective pivot point, movement of the output crank resulting in the opening and/or closing of the landing gear bay door.

There is further provided an apparatus for opening and closing a door of a landing gear bay in an aircraft comprising mechanical coupling means coupling the landing gear and the door, the coupling means comprising a drive rod coupled to the landing gear and a door rod coupled to the landing gear bay door; an input crank coupled at a first end to the drive rod, opposite the end of the drive rod that is coupled to the landing gear; and an output crank, coupled at a first end to the door rod; the input crank and the output crank independently pivotably coupled to the landing gear bay and further coupled to each other and configured so that pivotal movement of the input crank results in pivotal movement of the output crank thereby providing for the opening and closing of the bay door.

In one embodiment the input crank comprises a projection and the output crank comprises a slot, the projection being sized to be received within the slot on the output crank. The projection is preferably configured to move within the slot upon pivotal movement of the input crank. The movement of the projection within the slot results in pivotal movement of the output crank.

In another embodiment the input crank is pivotably connected to the drive rod and movement of the drive rod, upon retraction or extension of the landing gear, pivots the input crank about the connection point.

There is also provided an aircraft landing gear bay door opening and closing apparatus comprising a drive rod pivotably connected to the landing gear; a door rod coupled to the landing gear bay door; an input crank pivotably connected, at a first end, to the drive rod and coupled to the landing bay about an input crank pivot point; and an output crank pivotably connected to the door rod and coupled to the landing bay about an output crank pivot point; at least one of the input and the output crank having connecting means located thereon, configured to connect the input and output cranks so that movement of the input crank translates to movement of the output crank and opening or closing of the landing gear bay door.

In one embodiment the connecting means comprises at least one projection located on one of the input and output crank, the other of the input and output crank configured to receive the at least one projection thereon. In a further embodiment the connecting means comprises at least one projection, located on the input crank, configured to be received within an aperture located on the output crank. In an alternative embodiment the connecting means comprises at least one projection, located on the input crank, configured to be received within a slot located on the output crank opposite the end that is coupled to the landing gear.

BRIEF DESCRIPTION OF THE DRAWINGS

The present invention will now be described in further detail with reference to the following figures:

FIGS. 21A and 21B show the equations that define the movement of the roller and slot;

DETAILED DESCRIPTION OF THE PREFERRED EMBODIMENTS

Figure 1:
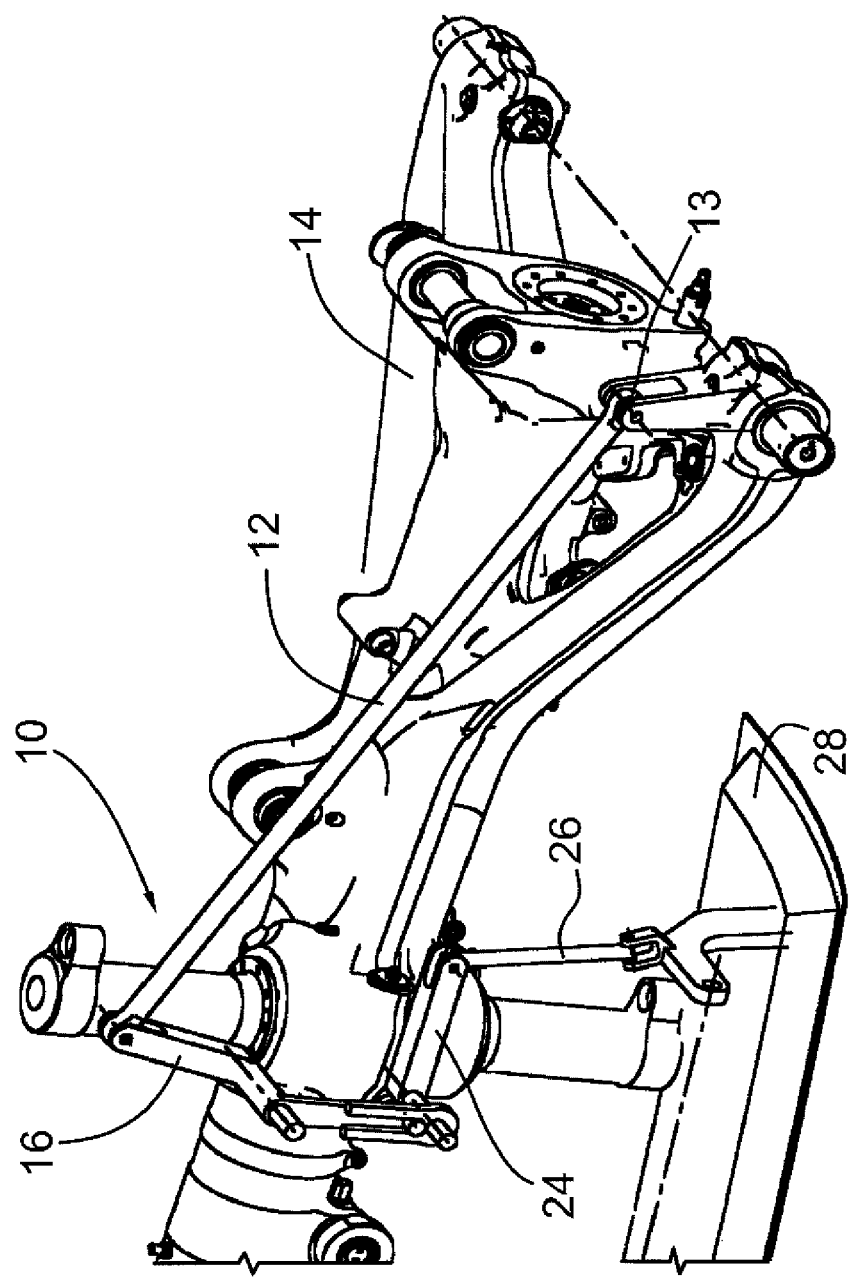
FIG. 1 is a schematic of one embodiment of the roller slot door mechanism of the present invention.

The present invention provides a door mechanism for use on aircraft landing gear bay doors. The door mechanism of the present invention is referred to herein as a roller slot door mechanism.

The roller slot door mechanism is connected at one end to the landing gear of the aircraft and at the other end to the landing gear bay doors. The roller slot door mechanism includes an input and an output crank that are interconnected and are operable to move relative to each other. The movement of the landing gear will initiate movement of the input crank which in turn will move the output crank which will translate into the opening and closing of the landing gear bay door.

The present invention provides an aircraft door mechanism that provides a high ratio between input and output for initial quick door movement. The aircraft door mechanism also provides greater control of the door motion while the gears are extending and retracting.

Further, the roller slot door mechanism of the present invention does not include springs or an over-centre to hold the doors during operation which reduces the number of components required.

The door mechanism of the present invention provides that the landing gear door opening and closing and the landing gear movement will not be out of sequence because of the continual engagement between the input and output cranks of the roller slot mechanism.

The present invention will now be described in detail with reference to the accompanying Figures in which the roller slot door mechanism is indicated generally at numeral 10.

The roller slot door mechanism 10 includes a drive rod 12 that is connected at one end 13 to the aircraft landing gear, indicated generally at numeral 14. At the opposite end, the drive rod 12 is connected to an input crank 16 which is operable to pivot about the connection point to the drive rod 12, indicated clearly at numeral 18 in FIG. 2.

Figure 2:
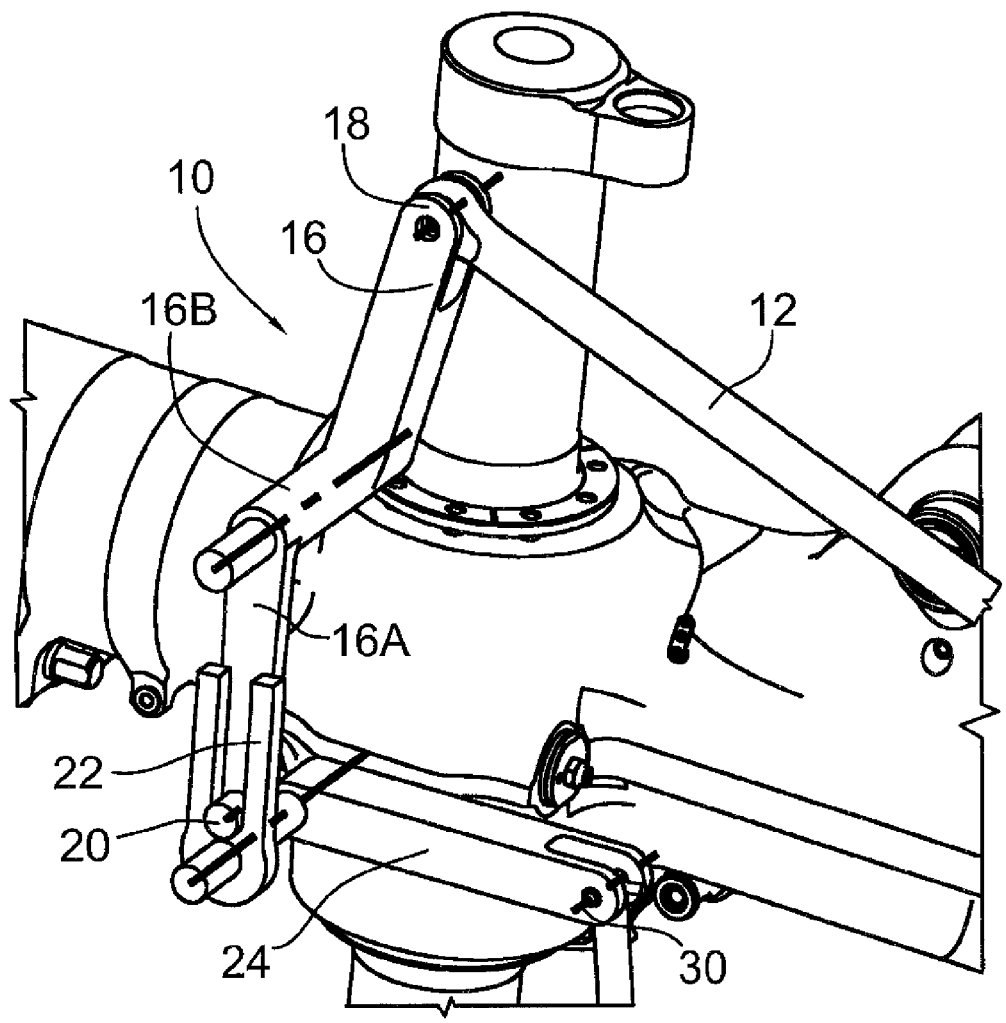
FIG. 2 is a schematic of one portion of the roller slot door mechanism of FIG. 1.

As can be seen in the figures the input crank 16 includes two end portions, indicated at numeral 16a, that run parallel to each other with a central shaft portion 16b, connecting the two end portions that runs perpendicular to the end portions 16a, shown in FIG. 2. It will be understood that the central shaft portion 16b may be included in embodiments where the door and landing gear attachment points are not in a common plane. The inclusion of the central shaft portion 16b may assist in aligning parts of the door mechanism. However, it will be understood that in one embodiment the input crank 16 does not include a central shaft portion 16b and only includes a main body to which a projection 20 or roller, described further below, is connected.

In one embodiment, shown for example in FIG. 2, the projection 20 extends away from the input crank 16 and is received within a slot 22 located on the output crank 24. The projection 20 is sized and shaped to be received within the slot 22 and is operable to move within the slot 22, as will be described in further detail below. The projection 20 and slot 22 connect the input and output cranks and may also be referred to herein as connecting means. It will be understood that the slot 22, illustrated herein, may also be referred to as an aperture and may be operable to receive the projection 20 therein to allow for movement of the projection within the aperture, as described and illustrated herein for the slot.

In one embodiment, the projection 20 extends beyond the edge of the slot to project out of the slot 22. The extension of the projection 20 beyond the slot 22 will account for all aircraft, door mechanism and landing gear tolerances, wear and deflections under load.

Figure 24:
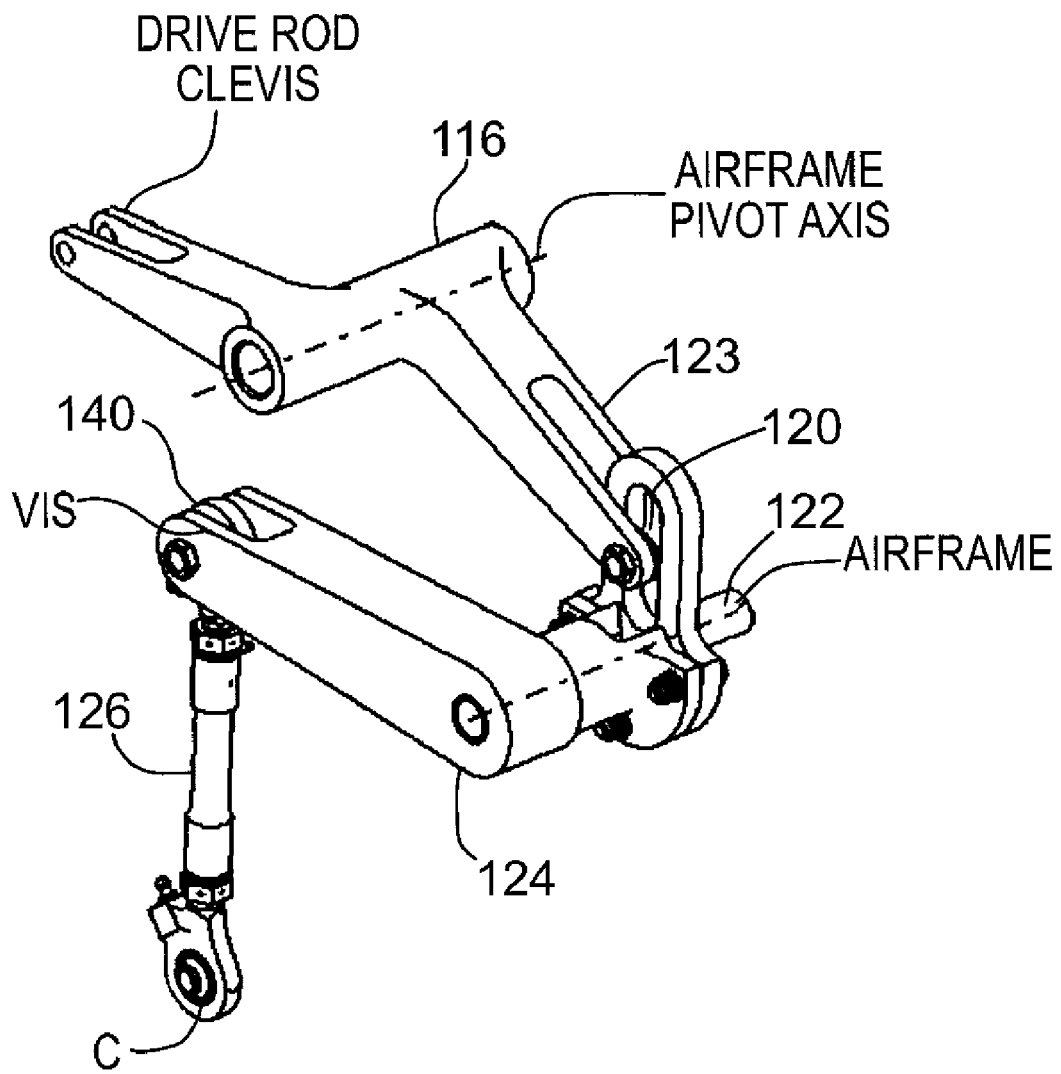
FIGS. 24 through 26 illustrate one embodiment of the roller and slot of the door mechanism of the present invention.
Figure 25:
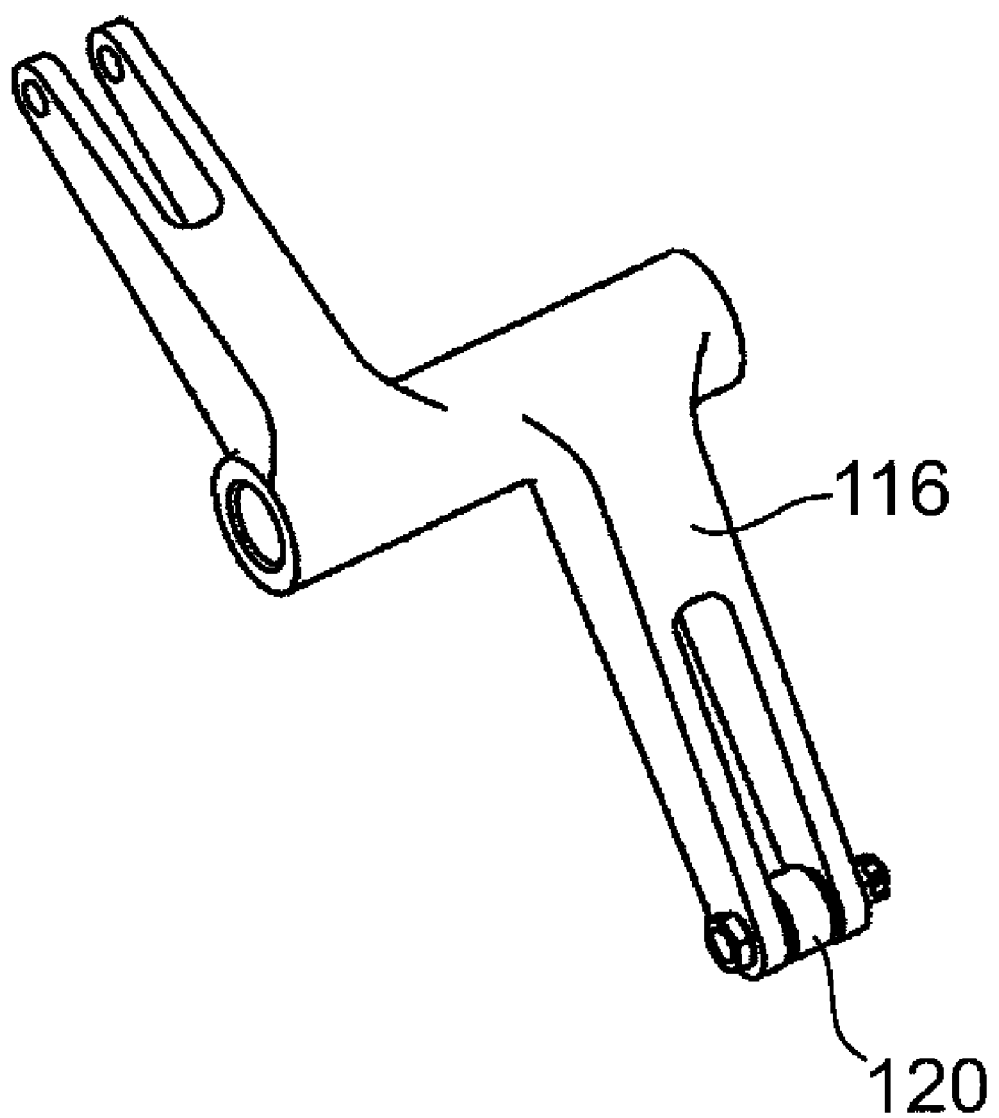
Figure 26:
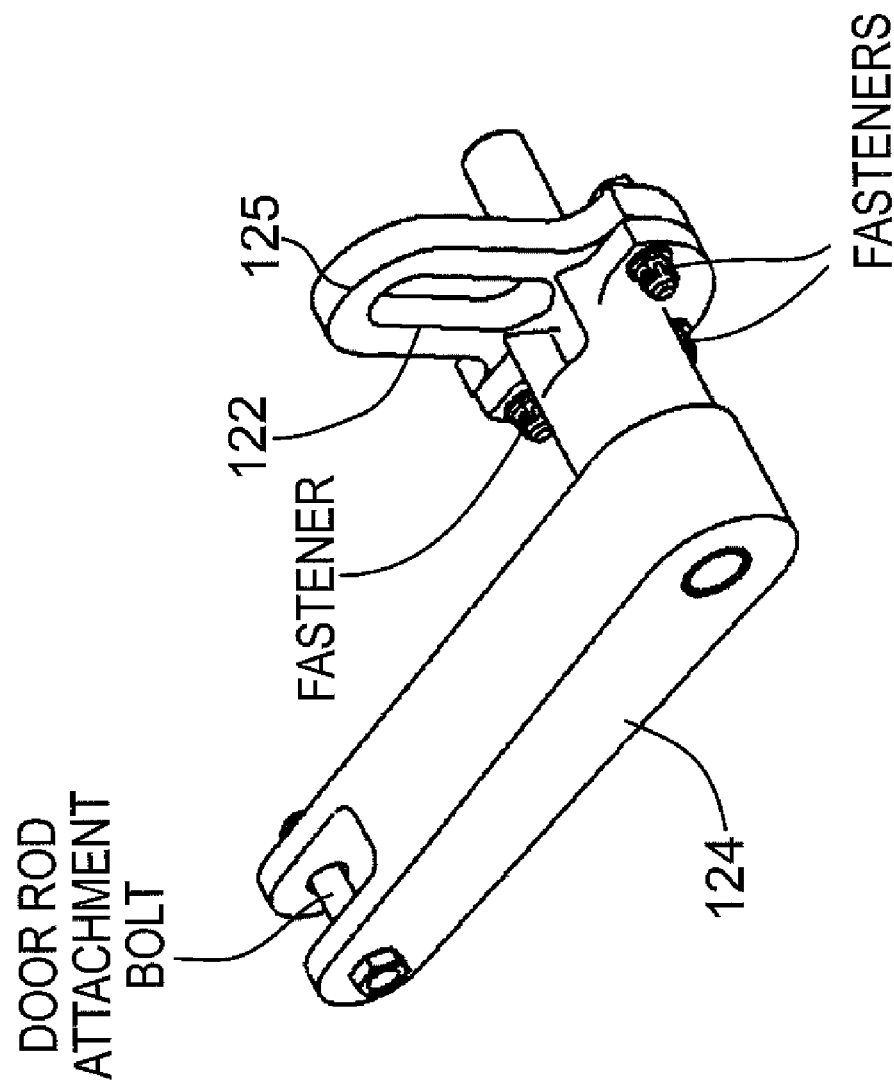

In an alternative embodiment, shown in FIGS. 24-26 the input crank 116 includes a roller 120 that is received within a slot 122 located on the output crank 124. The roller 120 is held within a roller clevis 123 that forms part of the input crank 116. It will be understood that the projection 120 and the roller 120 function in the same manner described herein and are merely different embodiments that may be used.

The roller 120 may be a typical roller used in the aerospace applications for other mechanisms such as flap tracks etc. In one embodiment, the roller includes an outer and inner ring, the rings being separated by a self-lubricated liner. Examples of the type of liner that may be used include, but are not limited to, a fabric impregnated with PTFE and/or other lubricating materials. In an alternative embodiment, the roller may be a standard needle bearing roller or a roller constructed with plain bushings, such rollers may require periodic greasing.

Figure 23:
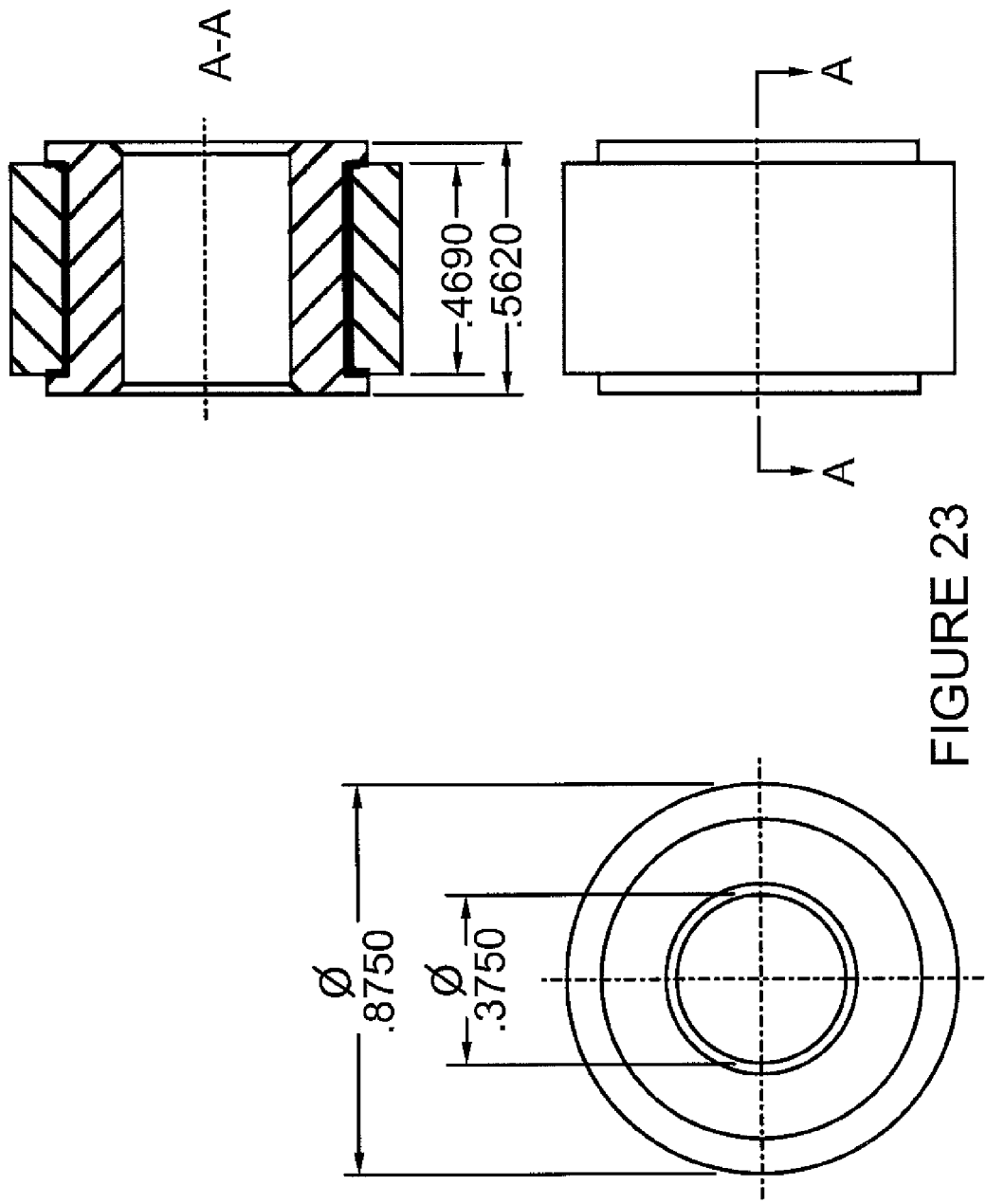
FIG. 23 illustrates one embodiment of a self lubricating roller used in the present invention.

An example of a self-lubricating roller is shown in FIG. 23. It will be understood that the dimensions provided are merely exemplary in nature.

It will be understood that the input and output cranks described herein are not limited to those shown in the Figures. Amendments may be made to their shape and form provided that they function in the manner described herein. In one embodiment the cranks are sub-assemblies of parts bolted together. The main portions of the input and output cranks, the shaft and arms described above, may be made from aluminum in order to reduce weight. Due to concerns of wear and contact stresses, the roller or projection on the input crank and the slot in the output crank are preferably made from a material that can withstand such wear. The slot on the output shaft may be made of steel finished with hard chrome plating or ammonia nitriding to provide a good wear surface. Aluminum or titanium with hard anodizing or other surface treatment may also be used if loads are low.

Figure 27:
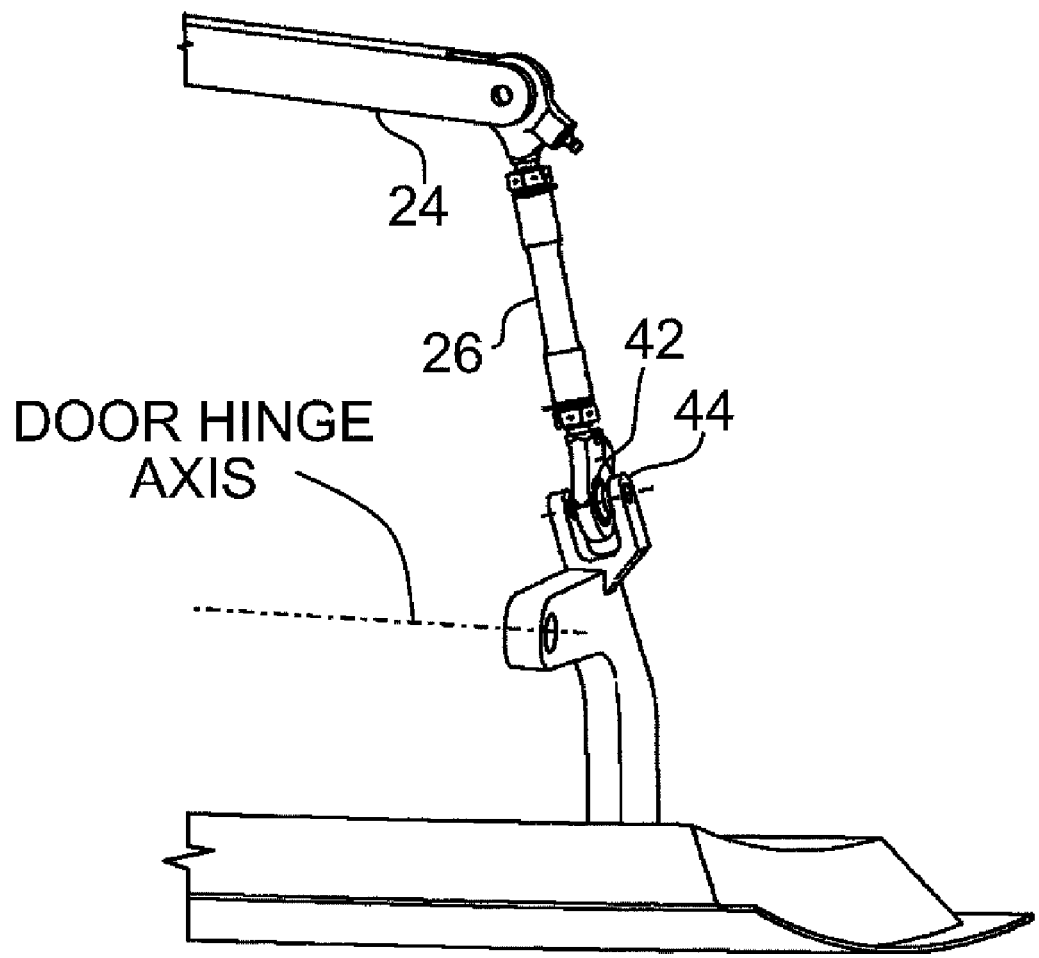
FIG. 27 illustrates one embodiment of the connection of the door rod to the landing gear bay door.

Turning back to FIGS. 1 and 2, at the opposite end of the output crank 24, from the end that includes the slot 22, the output crank 24 is connected to a door rod 26. The door rod 26 is connected, at the opposite end from the output crank 24, to an aircraft landing bay door, indicated generally at numeral 28. The door rod 26 is connected to the output crank 24 at a point that allows for pivotal movement of the door rod 26 relative to the output crank 24. The connection point of these two components is indicated generally at numeral 30 in FIG. 2. Due to the positioning of the door hinge at a right angle to the pivot axis of the output crank, the door rod needs to be operable to move in all 3 dimensions during operation. In order to cater for this movement, the door rod preferably consists of spherical joints at each end. These spherical joints may be typical aerospace spherical bearings consisting of a ball and a race. The ball has a hole through it and is pinned to a mating clevis, on the output crank and on the door, using a standard bolt. The bearings must have sufficient angular misalignment capability to cater for movements during the complete gear retraction/extension cycle. In order to reduce the misalignment experienced during movement, the clevis, and bolt axis, can be put in an optimum "skewed" position, indicated generally at numeral 44, that is not necessarily aligned with any other axis on the part. This is typical practice in aircraft landing gear design since pure planer motion is not usually possible due to space and geometry constraints. One example of the door rod connection to the door is shown in FIG. 27.

Figure 3A:
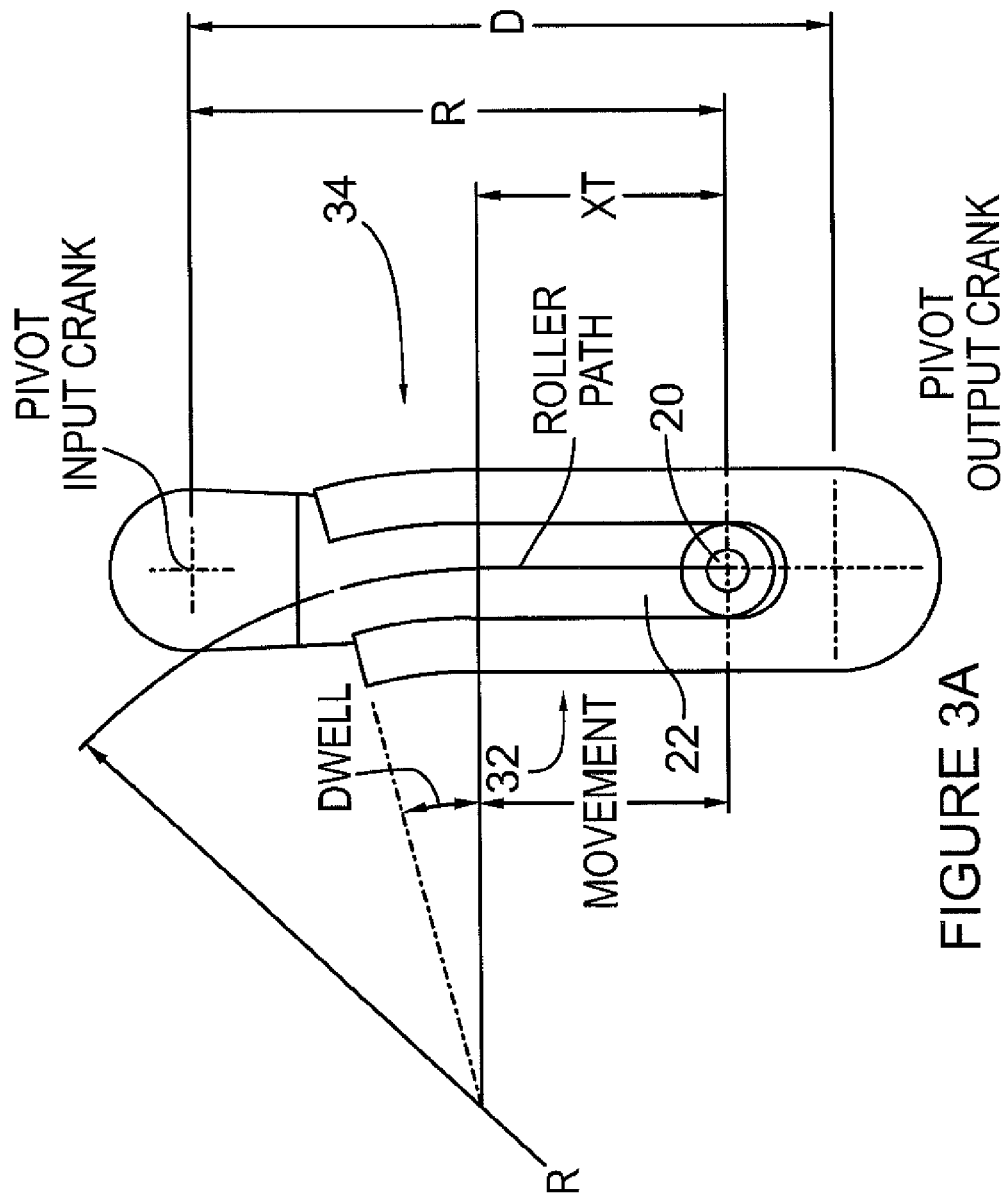
FIGS. 3A-C show the geometry of the roller slot mechanism of the present invention.
Figure 3B:
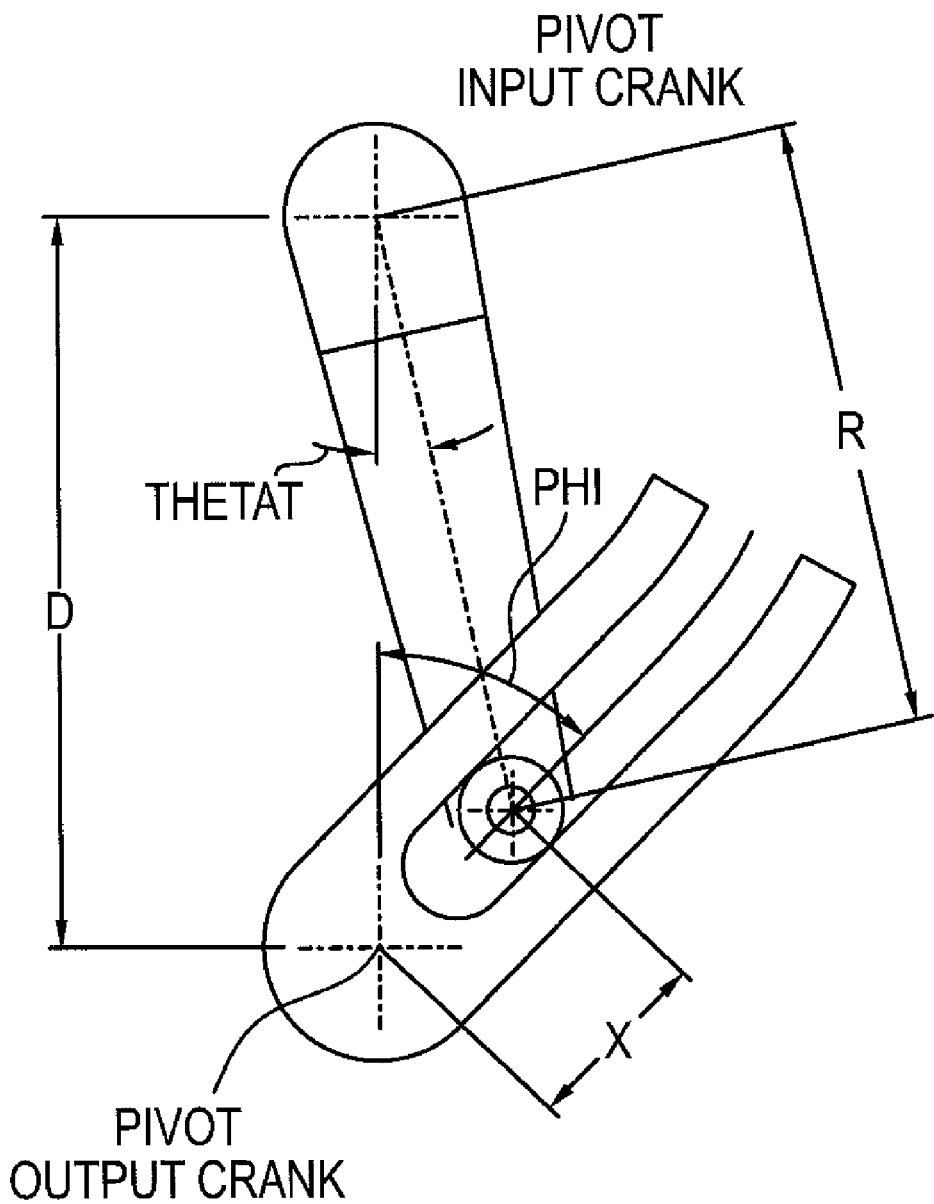
Figure 3C:
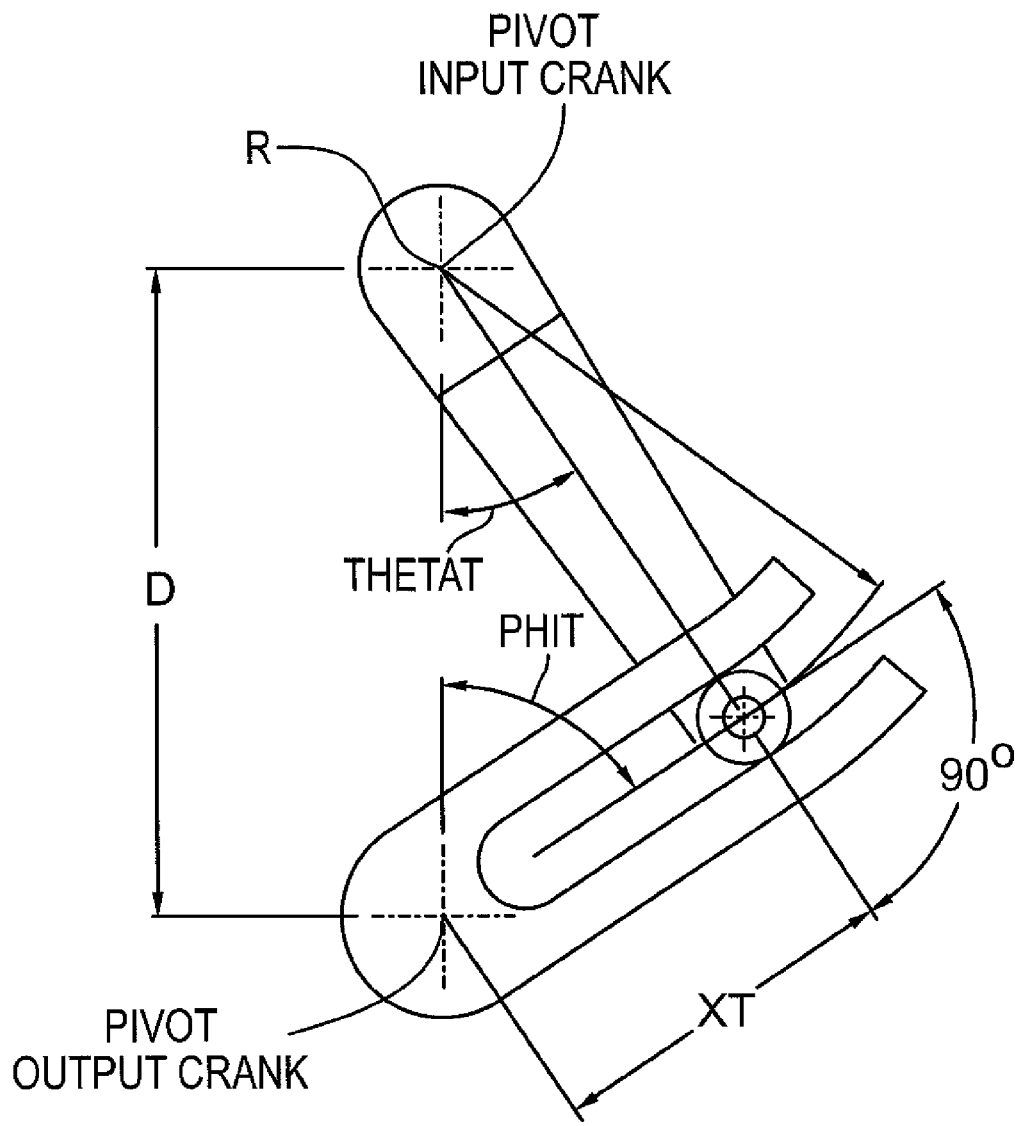
Figure 4:
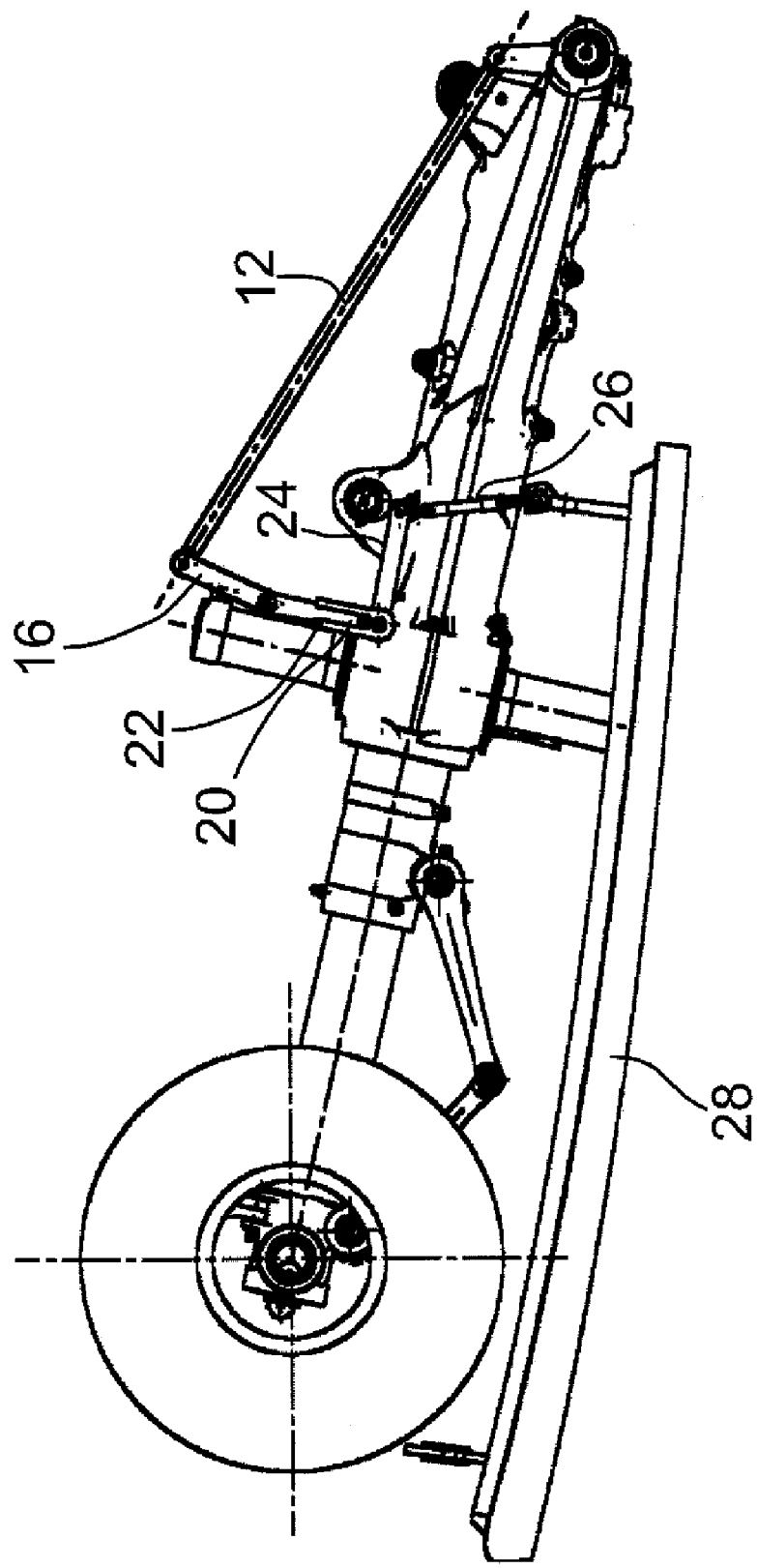
FIGS. 4-7 show the roller slot mechanism of the present invention in use on an aircraft landing gear shown in a retracted position.
Figure 5:
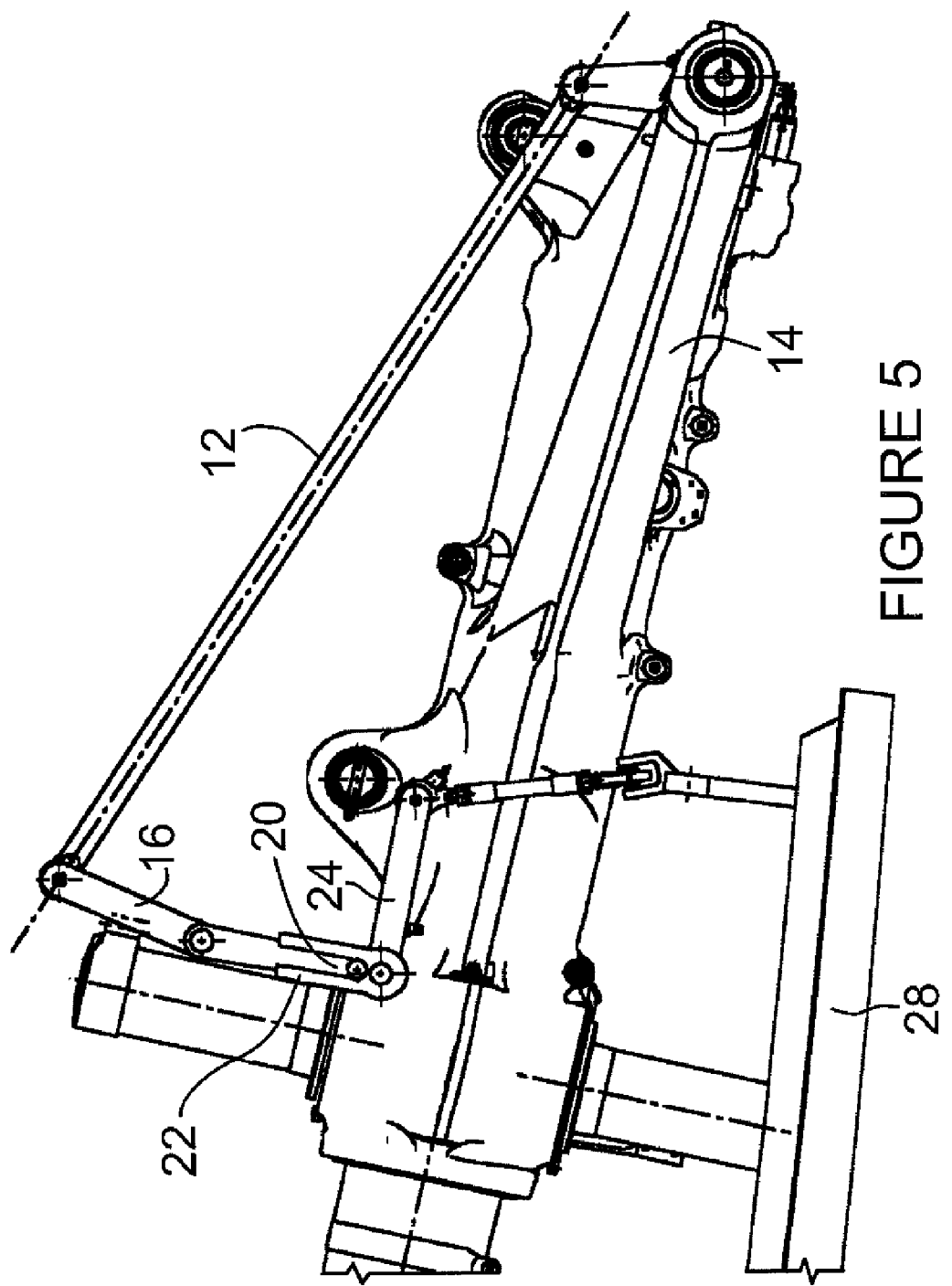
Figure 6:
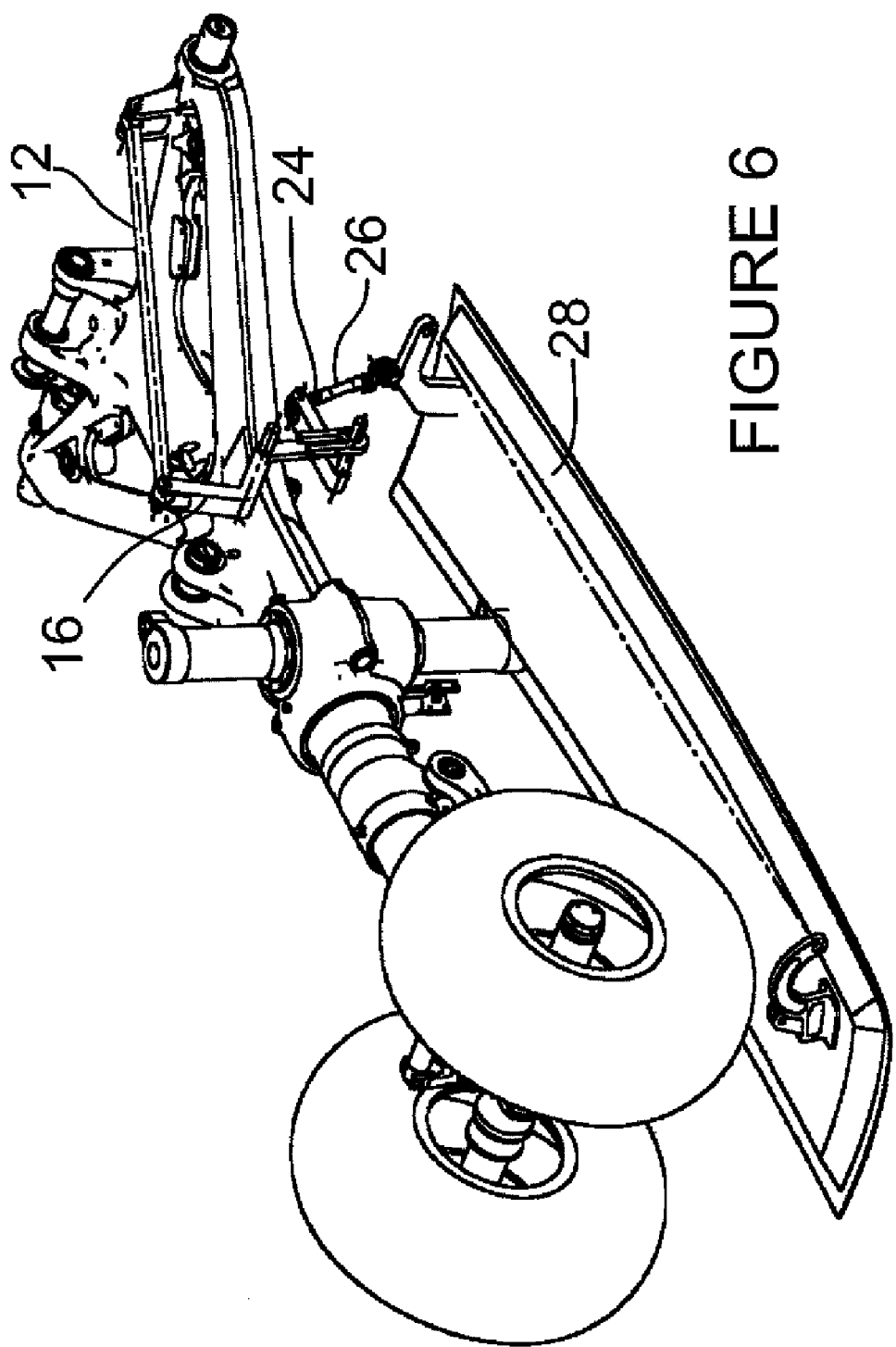
Figure 7:
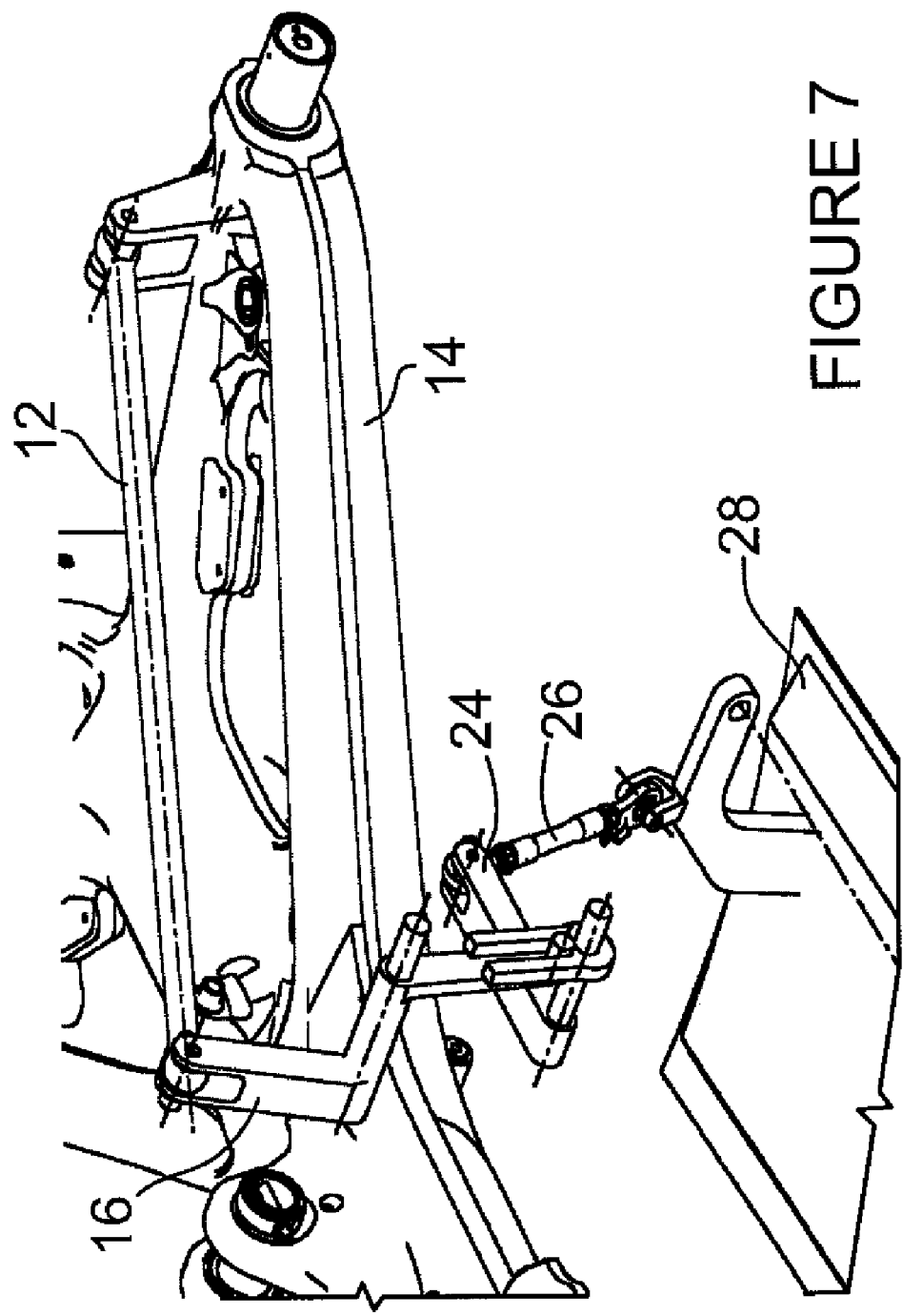

FIGS. 3A-C show the movement of one embodiment of the projection 20 within the slot 22. As can be seen in these figures, the slot 22 includes a straight portion, indicated generally at 32, and an arced portion, indicated generally at 34. When the projection 20 moves within the straight portion 32 of the slot 22 the movement causes the output crank to rotate and this rotation translates to movement of the door rod 26, through the connection of the output crank 24 to the door rod 26, which opens or closes the landing gear bay door 28. FIGS. 3A-C illustrate one embodiment of the geometry of the projection 20 and slot 22 arrangement.

As can be seen in FIGS. 3A-C rotation of the input crank 16 will initially cause amplified rotation of the output crank 24 based on the ratio R/(D-R). As the input crank 16 continues to rotate the amplification will be reduced. When the projection 20 reaches the end of the straight portion 32 of the slot 22, seen in FIG. 3C, the movement of the projection 20 is perpendicular to the slot 22. The arced portion 34 is now concentric with the input crank pivot. Any further rotation of the input crank 16 will not result in movement of the output crank 24. In this position, the landing gear bay door 28 is held open.

Figure 21A:
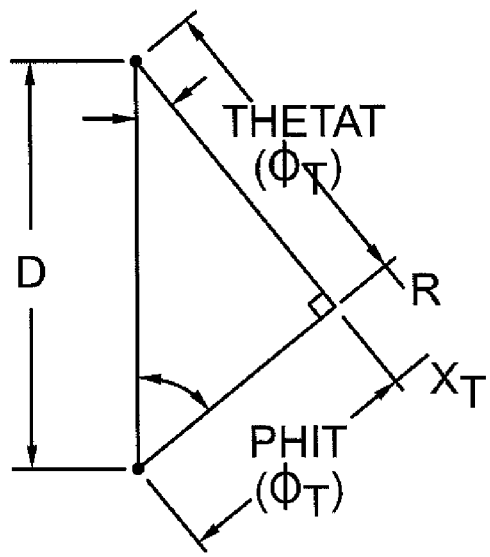

The complete movement of the projection 20 and slot 22 geometry can be defined by the equations shown in FIGS. 21A and 21B.

It will be understood that the above description and accompanying figures showing the projection/roller and slot geometry are based on a substantially linear slot, however this is only one embodiment of the projection/roller and slot configuration. The roller slot mechanism described herein may include slots having a geometry based on other mathematical curves such as splines, parabolas and trigonometric functions. The use of alternative geometries may provide for variations in the control of the movement of the landing gear bay door. Alternative geometries of the slot will allow for fine tuning of the motion of the door and therefore provide greater control of the door movement.

It will be understood that the movement of the roller 120 within the slot 122 will also be as described above for the projection and slot embodiment.

As stated above, an alternative embodiment of the input and the output crank are shown in more detail in FIGS. 24-26. FIG. 24 shows one embodiment of the input crank and output crank sub-assembly including the roller 120 received within the slot 122 located on the output crank 124. As can be seen in FIG. 24, in this embodiment the roller 120 is located between two portions of the input crank, referred to herein as the roller clevis 123. The roller 120 is sized to be received within the slot 122 on the output crank 124. In this embodiment the slot 122 includes a closed end 125 and the roller 120 is received within the closed slot 122 and is operable to move along the length of the slot 122. The output crank 124 is connected, at the opposite end to the connection of the input crank 116, to a door rod 126. The door rod 126 is as described above for door rod 26 and is attached at one end to the aircraft landing bay door at the connection point indicated at numeral C in FIG. 24. The connection of the door rod 126 to the landing bay door may be by any means known in the art. For example, the connection of the door rod to the landing bay door and/or the output crank 124 may use spherical bearings, as seen in FIG. 24 at numeral 140. The input crank 116 with the roller 120 of this embodiment is clearly shown in FIG. 25 and the output crank 124 is shown in FIG. 26.

Figure 8:
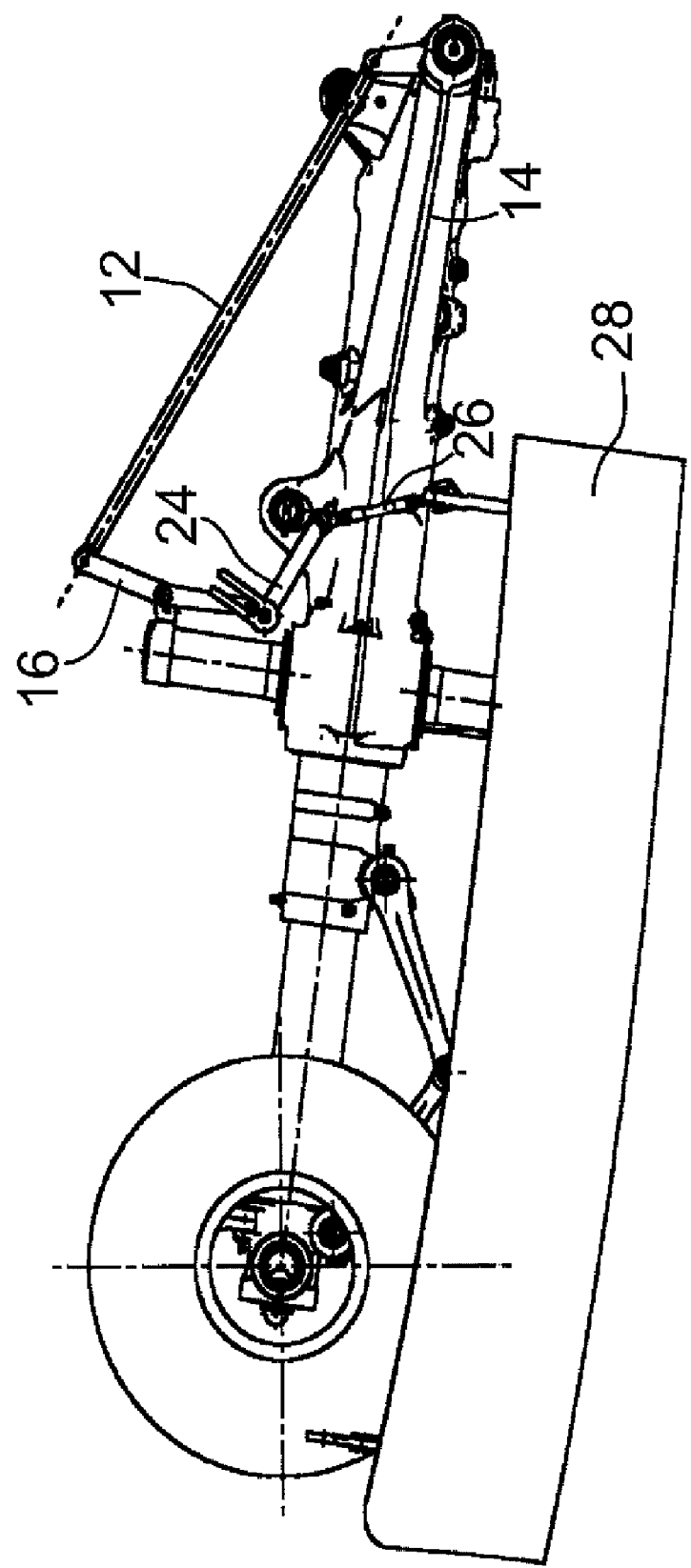
FIGS. 8-10 show the roller slot mechanism of the present invention in use on an aircraft landing gear shown in a 5° extended position.
Figure 22:
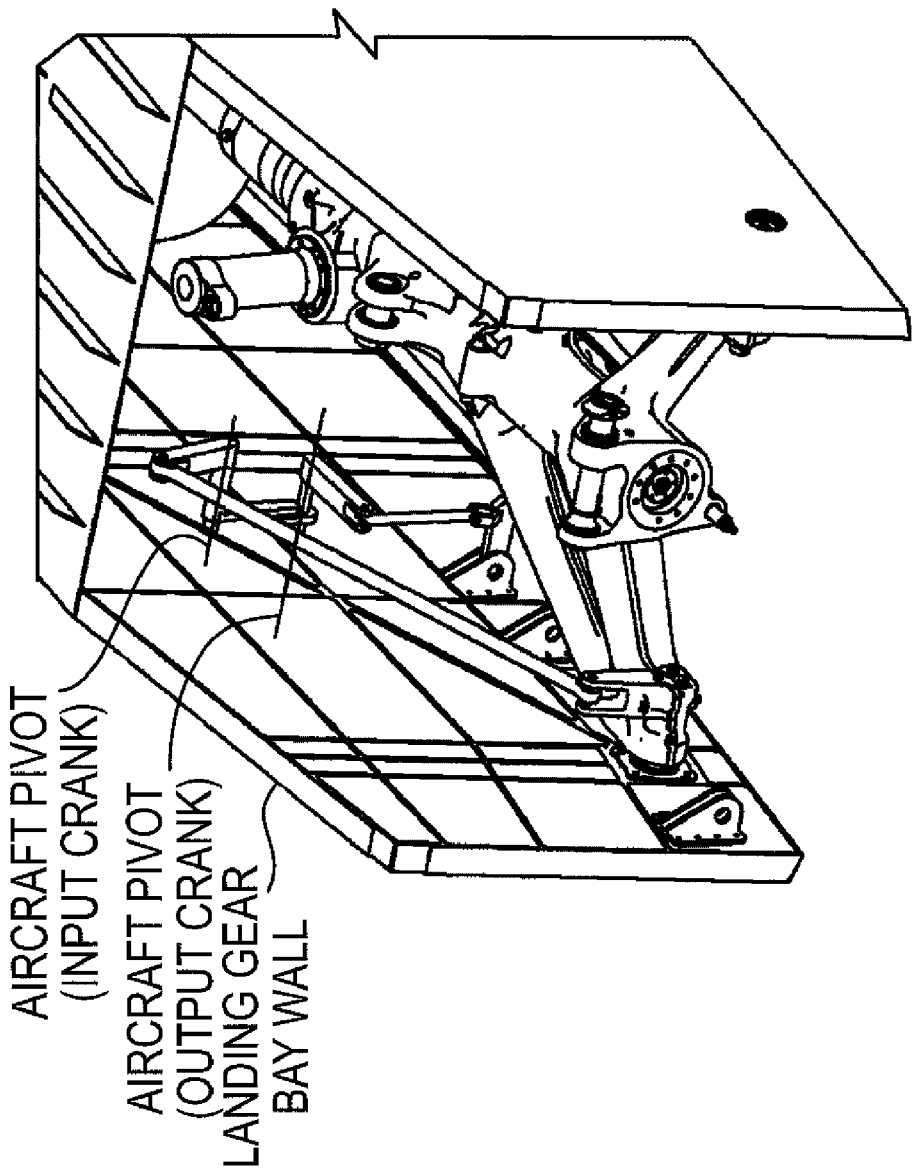
FIG. 22 shows the position of the door mechanism of the present invention with respect to the landing gear bay wall.

The aircraft attachment to the input crank and the output crank is made at the pins that extend from the input and output cranks, shown for example, in FIG. 8. These pins attach to the side wall of the landing gear bay. The bay wall may have 2 holes with bushings or bearings to accommodate the pins on the input and output shafts. One example of attachment may be made by axially retaining the landing gear bay wall by a threaded portion on the end of the pin onto which a nut could be attached after installation in the aircraft. Alternatively, the landing gear bay wall may have 2 pins extending from it, and the input and output cranks could have the bushed bores. The position and attachment of the input crank 16 and the output crank 24 relative to the landing gear bay wall is also shown in FIG. 22.

The operation of the roller slot door mechanism 10 will now be described with specific reference to FIGS. 4-20. The door mechanism will be described as a projection/slot mechanism, however, as stated above, the door mechanism may use a roller/slot mechanism that will function as described below.

In general, the drive rod 12, which is connected to the landing gear 14, will be moved by rotation when the landing gear 14 extends and retracts. The movement of the drive rod 12 will cause the input crank 16 to rotate which in turn causes the projection 20 to move within the slot 22 of the output crank 24. The movement of the projection 20 within the slot 22 cause rotation of the output crank 24 which results in movement of the door rod 26 which in turn opens and/or closes the landing gear bay door 28.

FIGS. 4 through 7 illustrate the landing gear 14 in the fully retracted position within the landing gear bay with the landing gear bay door 28 closed. In this position the projection 20 on the input crank 16 is received at the closed end of the straight portion 32 of the slot 22. The straight portion 32 and the curved portion 34 of the slot 22 can be seen in FIGS. 3A-C.

Figure 9:
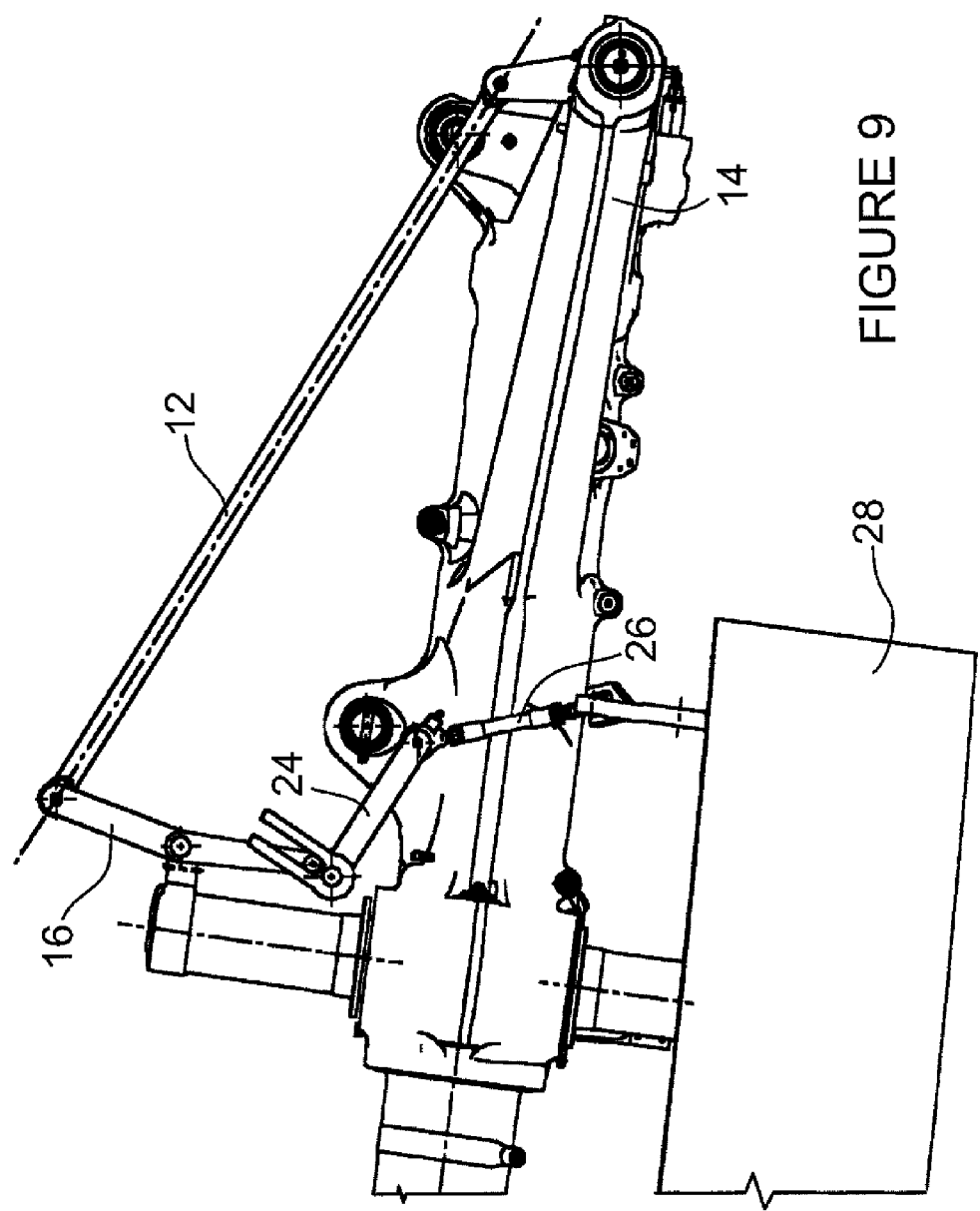
Figure 10:
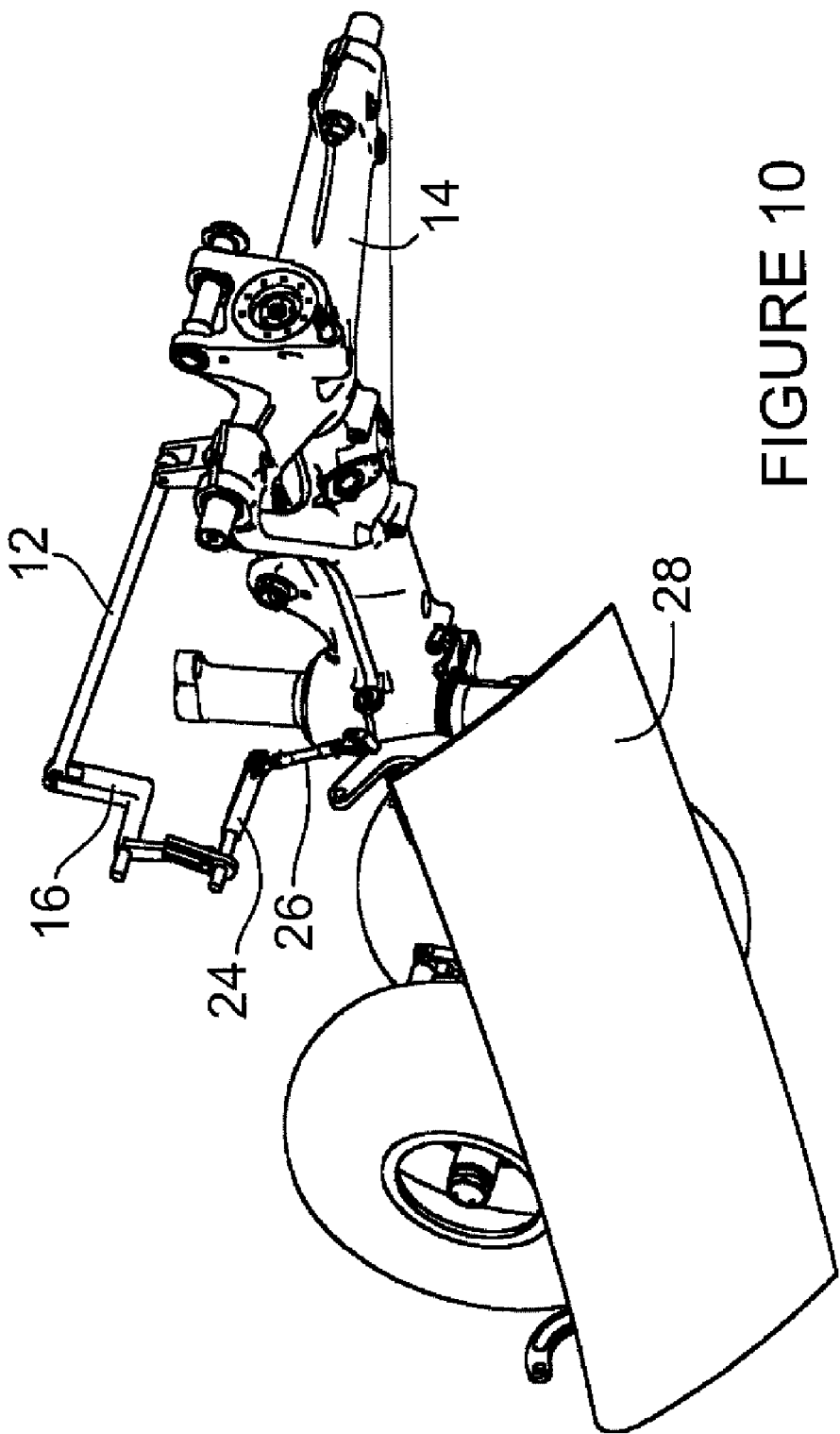

As the landing gear 14 begins to extend, the input crank 16 is forced to rotate through its attachment to drive rod 12. FIGS. 8-10 show the landing gear 14 extended at a 5° angle. Rotation of the input crank 16 moves the projection 20 within slot 22 moving it along the straight portion 32 towards the open end. This movement forces a rotation of the output crank 24 which applies a force to the door rod 26 which initiates the opening of the landing gear bay door 28.

Figure 11:
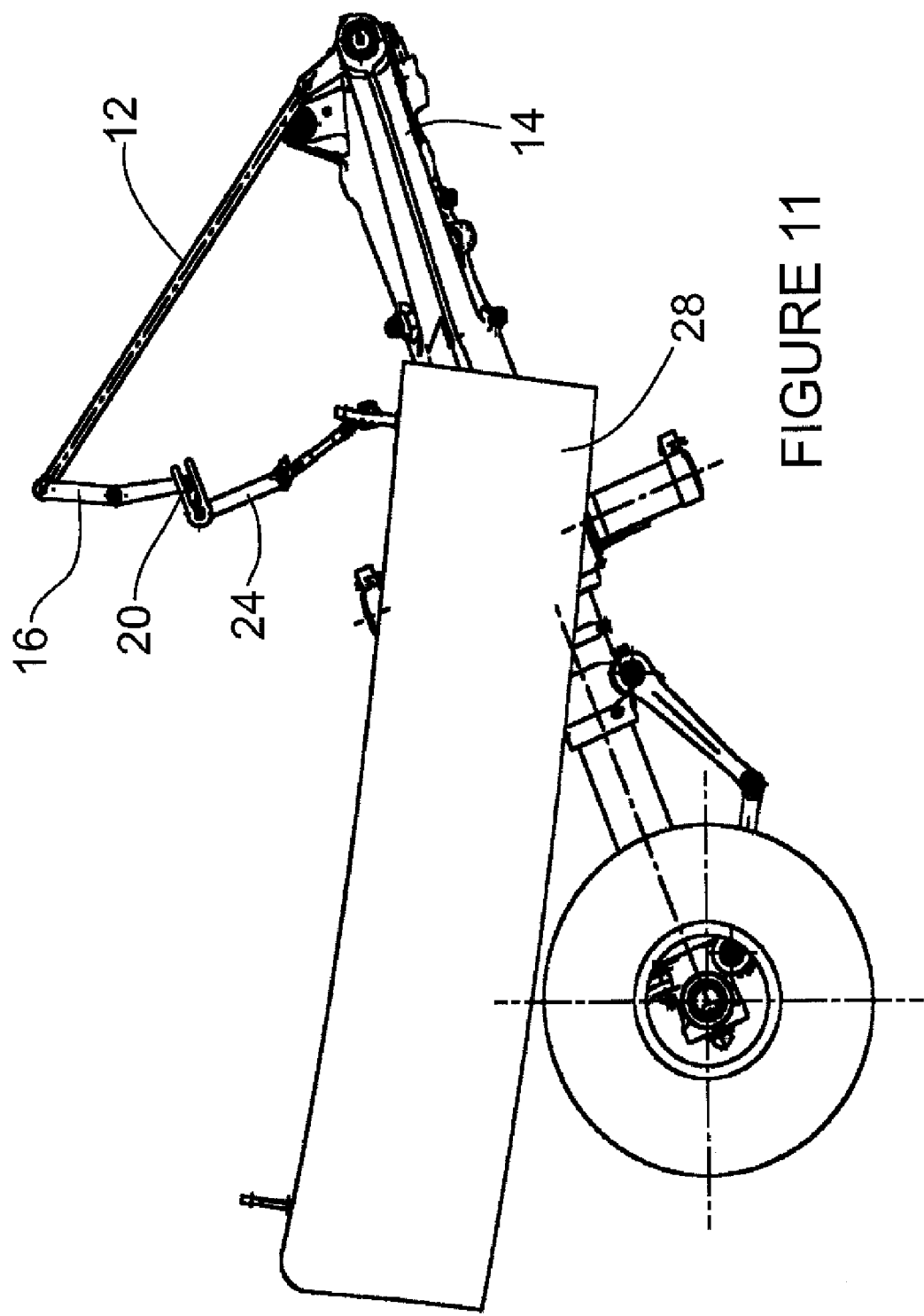
FIGS. 11-13 show the roller slot mechanism of the present invention in use on an aircraft landing gear shown in a 35° extended position.
Figure 12:
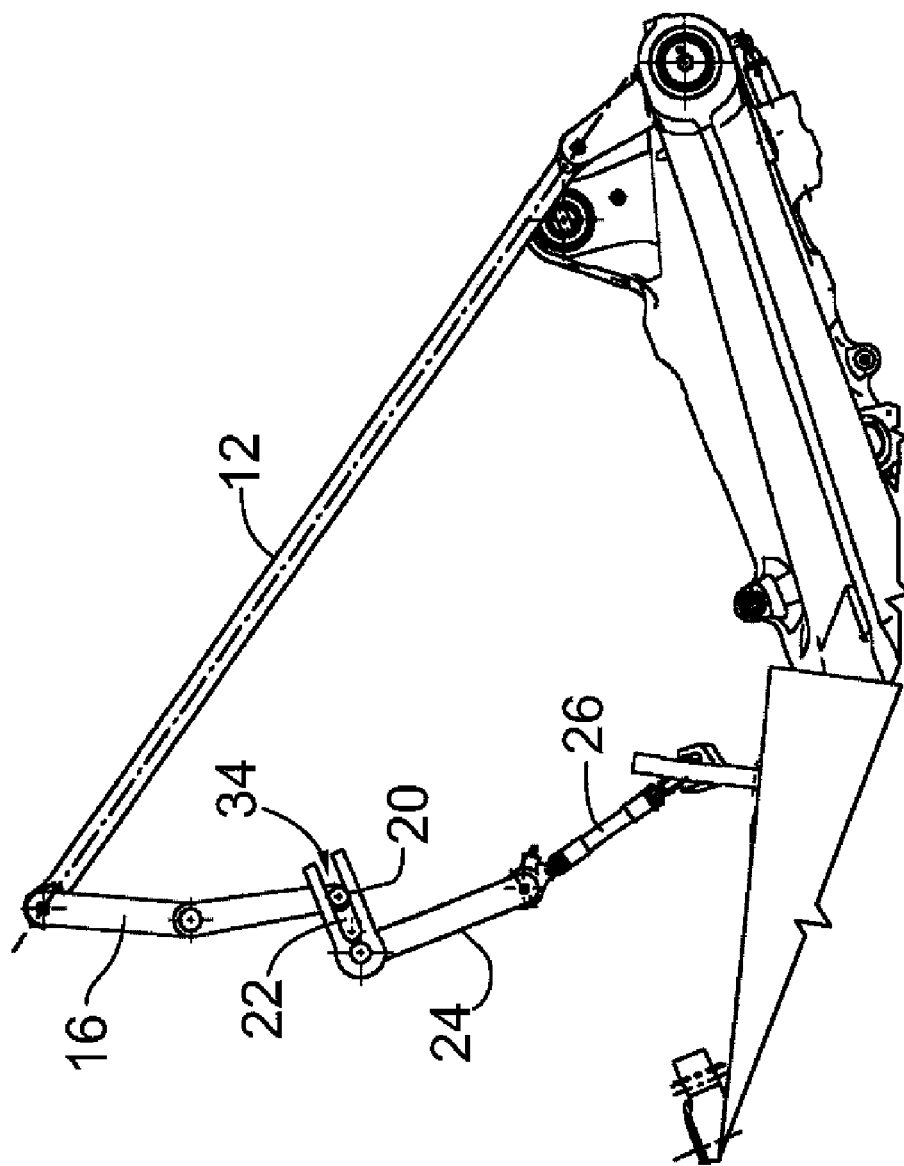
Figure 13:
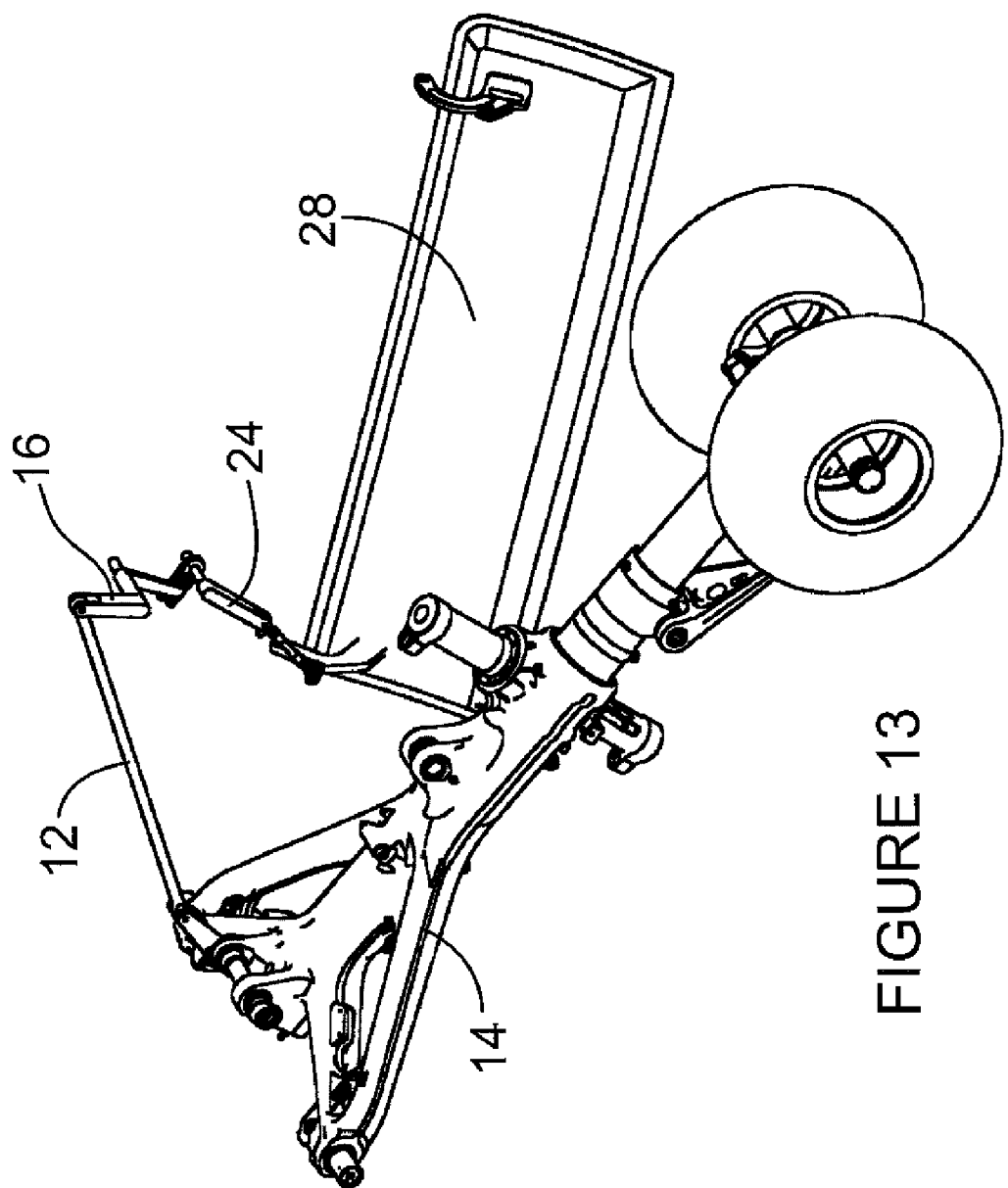

FIGS. 11-13 show the landing gear 14 extended at a 35° angle. In this position the landing gear bay door 28 is open and the landing gear 14 is able to pass through the door. At this point, the continued rotation of the landing gear 14 has rotated the input crank 16 and moved the projection 20 along the straight portion 32 of the slot 22 towards the arced portion 34.

As stated above, once the projection has reached the arced portion 34 of the slot 22, any further rotation of the input crank 16 will not result in movement of the output crank 24. The door is therefore held open. It will however, be understood that the door may be held open, at a sufficient distance for the landing gear to pass by, when the projection is located at the end of the straight portion of the slot 22 and it may not be necessary for the projection to enter the arced portion of the slot. It is preferable for the doors to be either completely stationary, i.e. when the projection is located in the arced portion, or almost stationary, i.e. when the projection is near the arced portion. The positioning of the projection within the arced portion will maintain the doors in the open position for a longer time that will allow the landing gear to pass by the doors.

Figure 14:
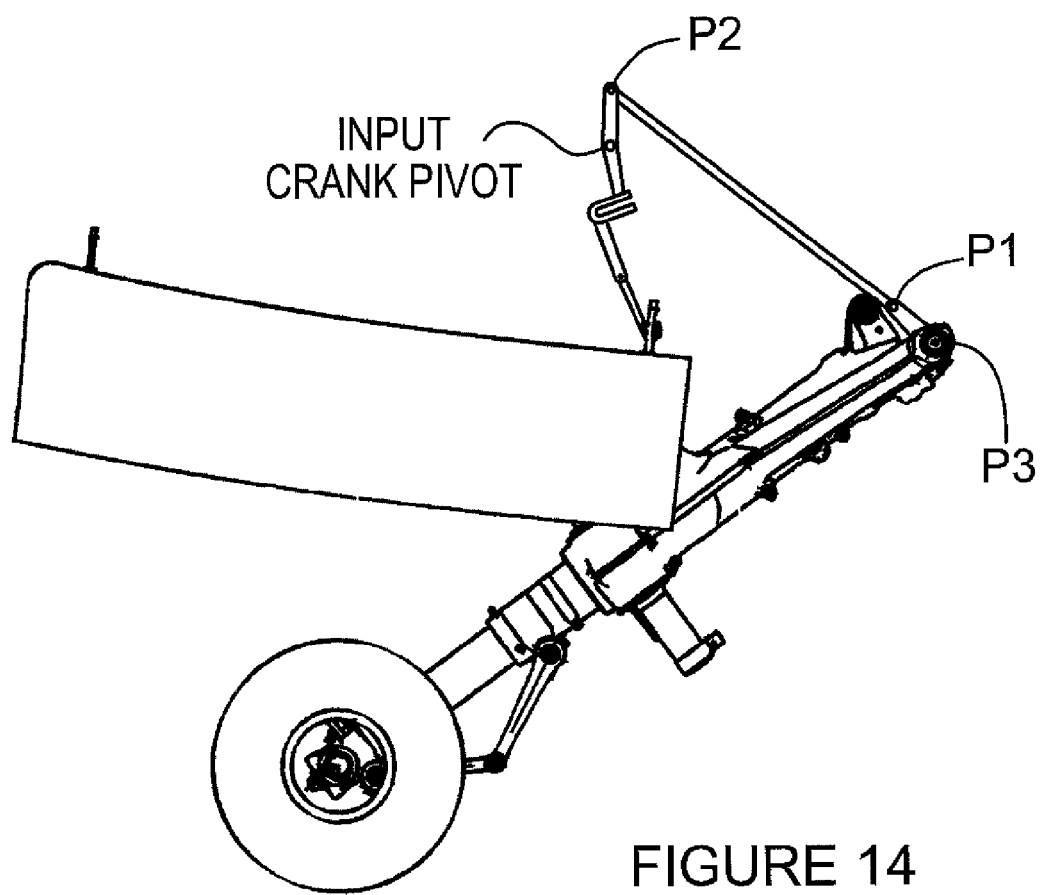
FIG. 14 shows the roller slot mechanism of the present invention in use on an aircraft landing gear shown in a 50° extended position.

When the point attaching the drive rod to the landing gear, indicated at P1 in FIG. 14, is in alignment with the point attaching the drive rod to the input crank, indicated at P2, and the landing gear pivot point, indicated at P3, the input crank begins to rotate in the opposite direction. This occurs at approx. 50° gear extension on the mechanism shown in FIG. 14.

Figure 15:
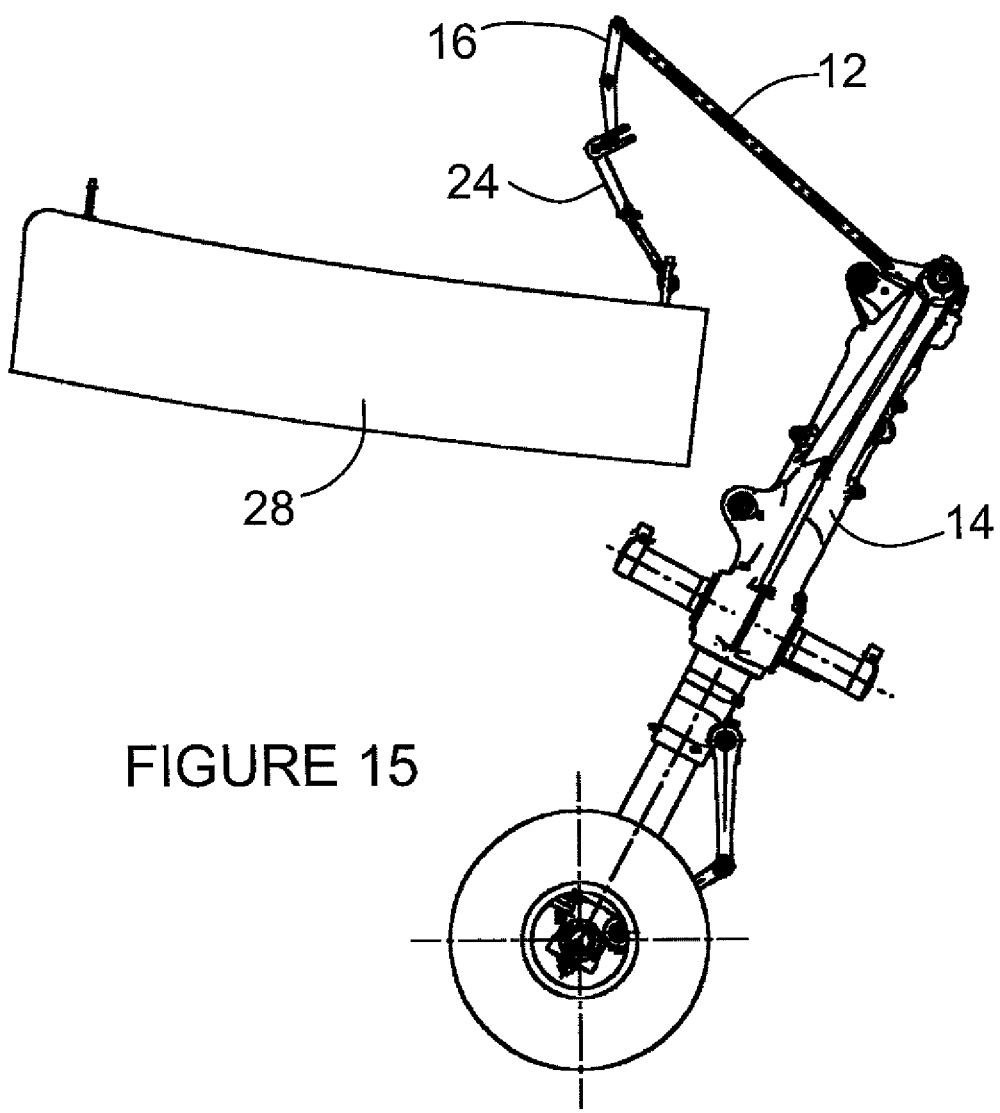
FIGS. 15-17 show the roller slot mechanism of the present invention in use on an aircraft landing gear shown in a 75° extended position.
Figure 16:
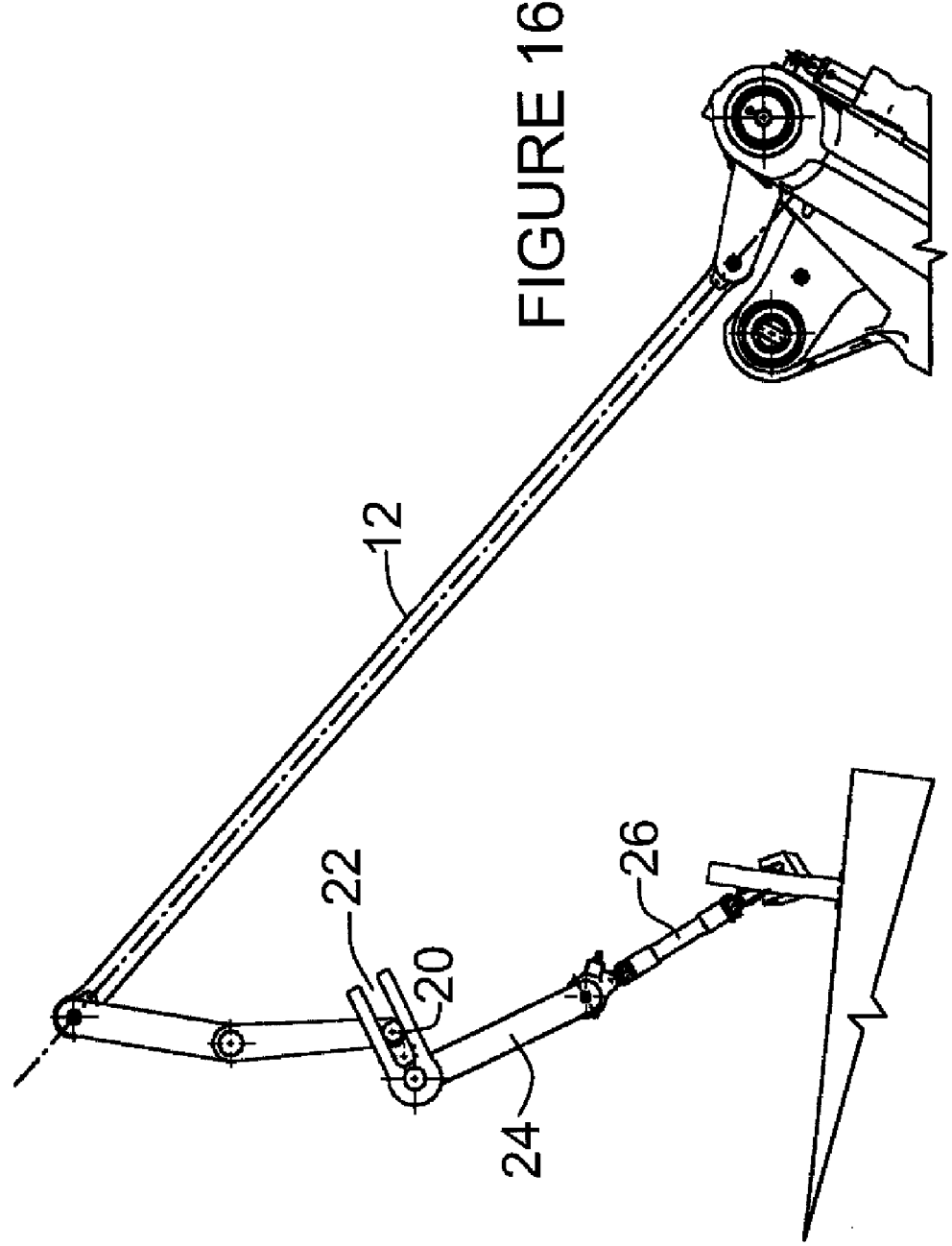
Figure 17:
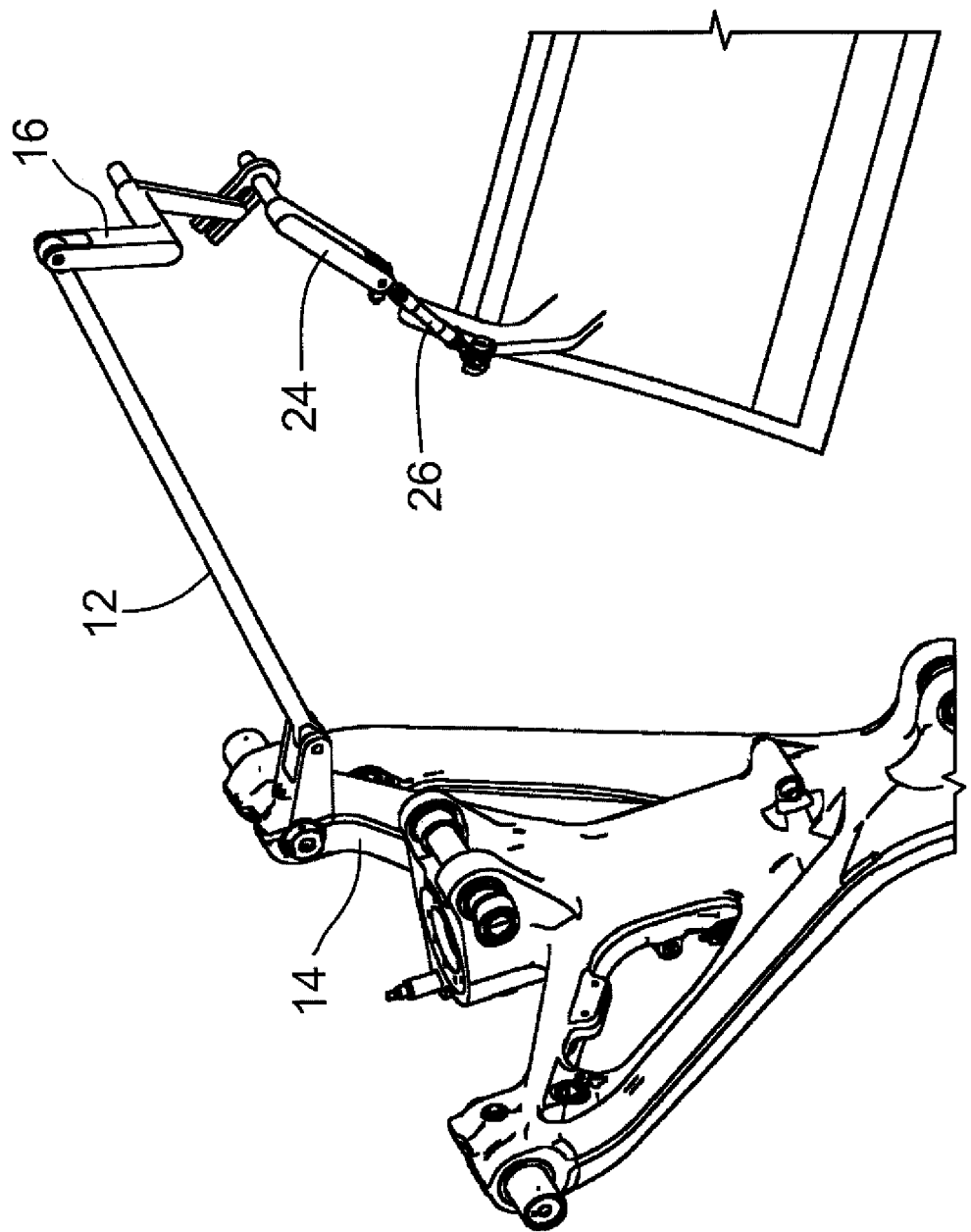
Figure 18:
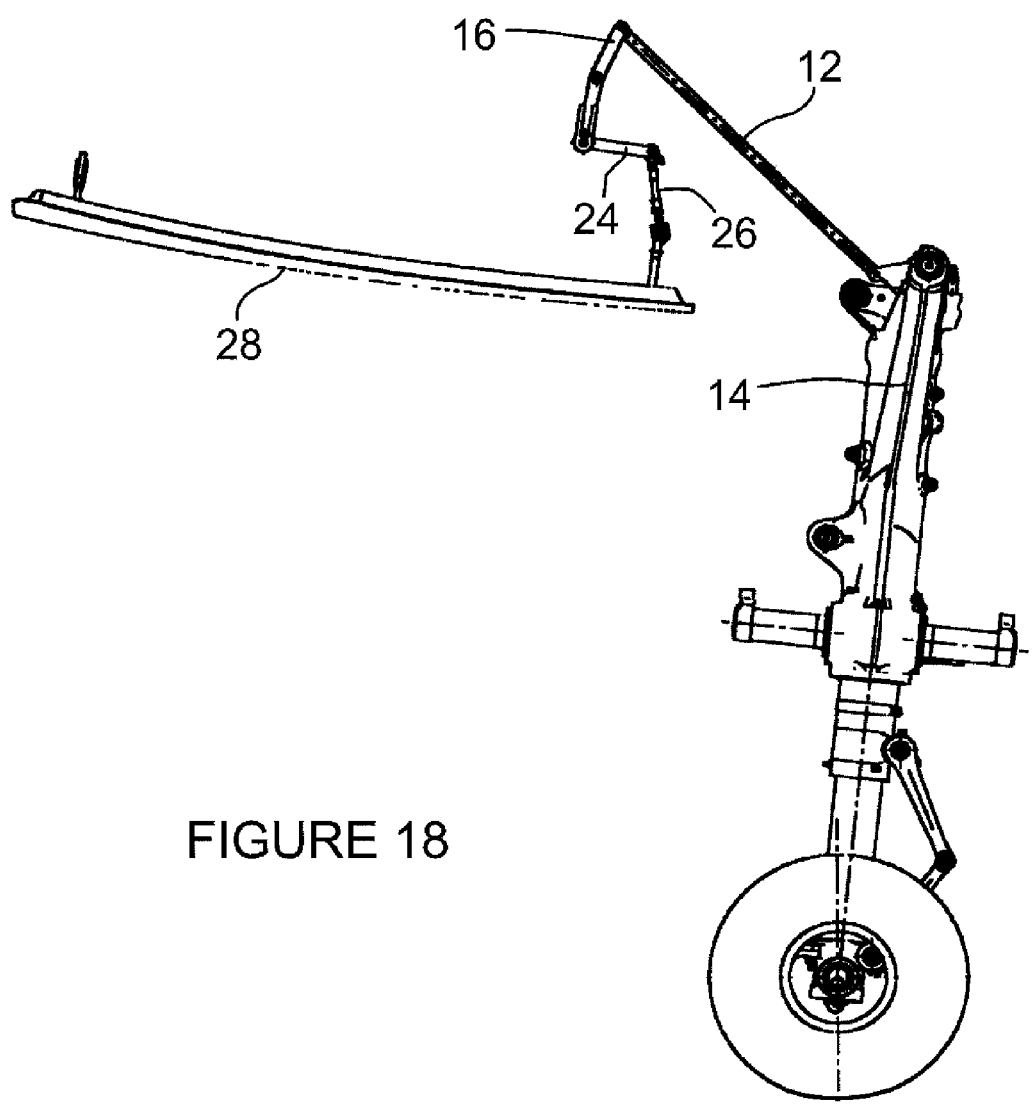
FIGS. 18-20 show the roller slot mechanism of the present invention in use on an aircraft landing gear shown in a 97° extended position.
Figure 19:
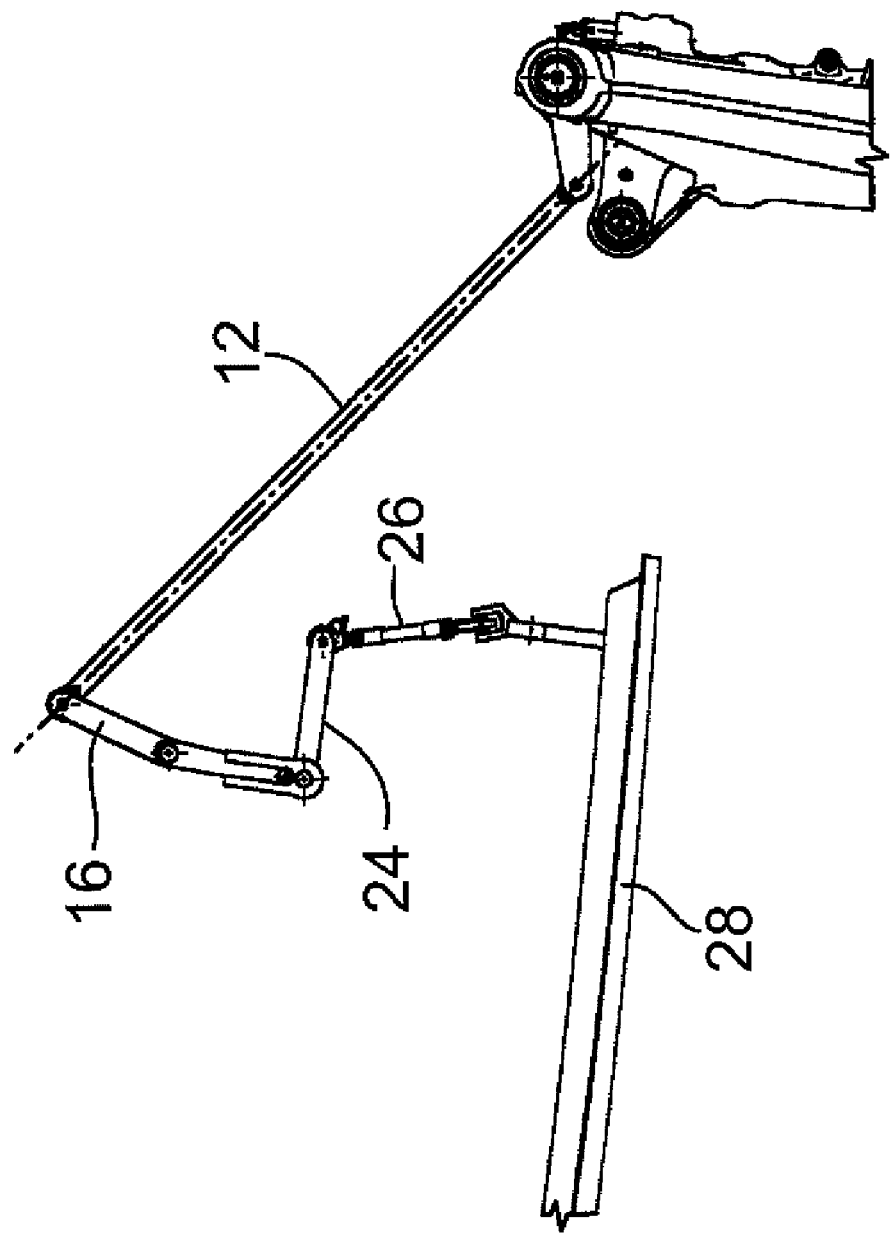
Figure 20:
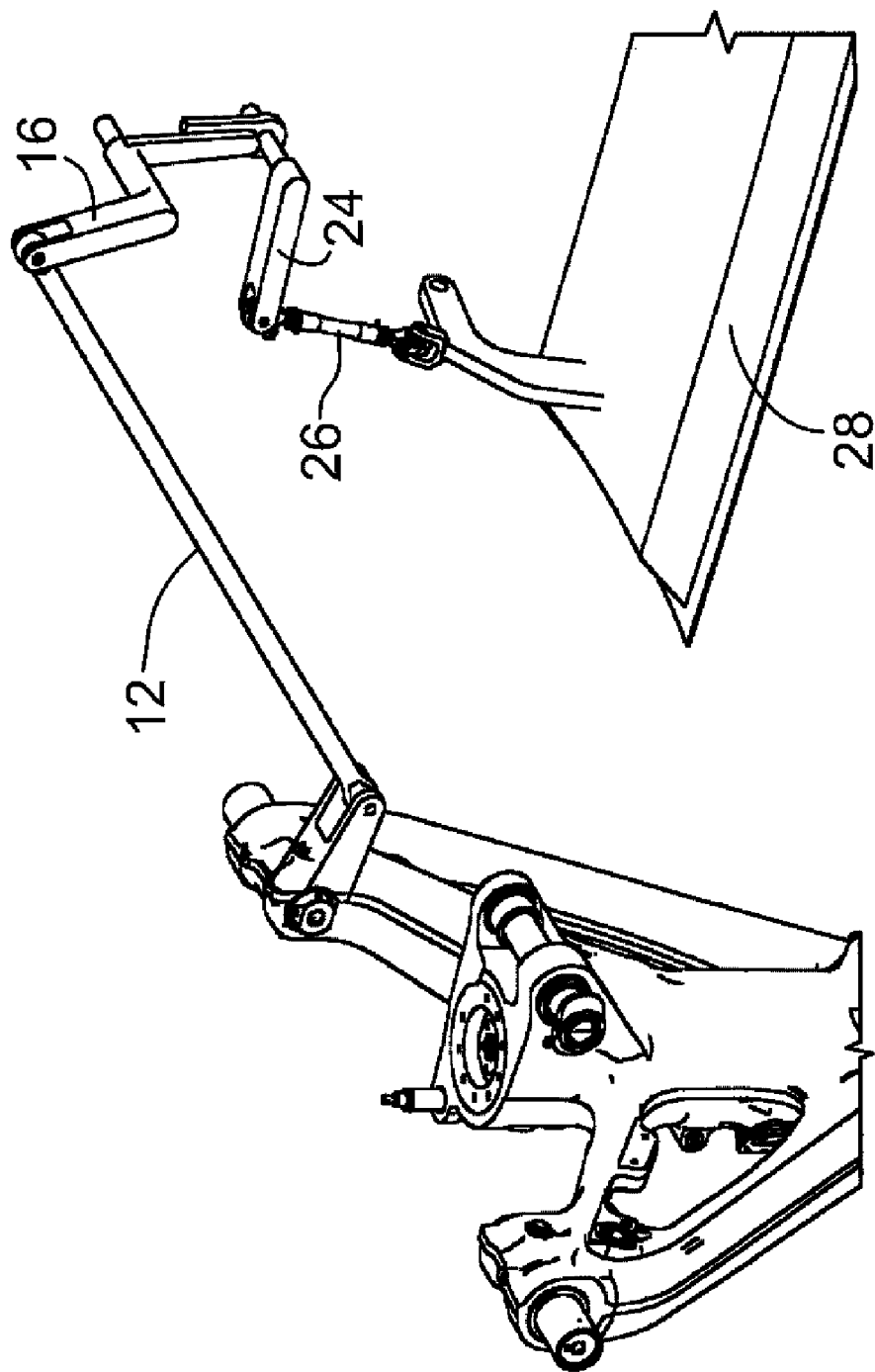

As the landing gear 14 reaches the fully extended position, the position of the drive rod 12, which is attached to the landing gear, forces the input crank 16 to rotate in the opposite direction to that described above. The change in rotation causes the projection 20 to move back to its starting position by moving down the arced portion 34 of the slot 22 towards the straight portion 32. As the projection 20 enters the straight portion 32 of the slot 22 it forces the output crank 24 to rotate in the opposite direction to that described above. This rotation pulls the door rod 26 which in turns pulls and closes the landing gear bay door 28. FIGS. 15-20 illustrate this movement with FIGS. 15-17 showing the landing gear 14 extended at a 75° angle and FIGS. 18-20 showing the landing gear extended at 97° extended position.

It will be understood that when the landing gear 14 begins to retract the movement of the components of the door mechanism described above will occur in reverse.

While this invention has been described with reference to illustrative embodiments and examples, the description is not intended to be construed in a limiting sense. Thus, various modification of the illustrative embodiments, as well as other embodiments of the invention, will be apparent to persons skilled in the art upon reference to this description. It is therefore contemplated that the appended claims will cover any such modifications or embodiments. Further, all of the claims are hereby incorporated by reference into the description of the preferred embodiments.

Any publications, patents and patent applications referred to herein are incorporated by reference in their entirety to the same extent as if each individual publication, patent or patent application was specifically and individually indicated to be incorporated by reference in its entirety.

I claim:

1. An aircraft landing gear roller slot mechanical linkage coupling the aircraft landing gear to a landing gear bay door for opening and closing the landing gear bay door, the mechanical linkage comprising:

a drive rod pivotably coupled at one end to the aircraft landing gear;

an input crank pivotably coupled at a first end to the drive rod, at the opposite end of the drive rod from the landing gear, the input crank including a connecting means located at a second end;

an output crank comprising a slot defined at one end thereof, the slot being configured to receive the connecting means therein, the connecting means configured to move along a length of the slot upon pivotal movement of the input crank to cause the output crank to rotate; and a door rod pivotably coupled to the output crank at the opposite end of the output crank to the slot, the door rod further coupled to the landing gear bay door, wherein initial extension of the aircraft landing gear causes the mechanical linkage to move the landing gear bay door to an open position, extension of the aircraft landing gear past the landing gear bay door allows the mechanical linkage to maintain the landing gear bay door in the open position to allow the aircraft landing gear to pass, and approaching full extension of the aircraft landing gear causes the mechanical linkage to move the landing gear bay door to a closed position.

2. The roller slot mechanism according to claim 1, wherein the connecting means is a projection.

3. The roller slot mechanism according to claim 1, wherein the connecting means is a roller.

4. The roller slot mechanism according to claim 1, wherein the connecting means is sized to be received within the slot and configured to move within the slot upon rotation of at least one of the input and output cranks.

5. The roller slot mechanism according to claim 1, wherein extension and/or retraction of the landing gear initiates rotation of the input crank.

6. The roller slot mechanism according to claim 1, wherein the output crank comprises a first arm coupled to a second arm, the second arm being perpendicular to the first arm, the slot extending outwardly from the free end of the second arm.

7. The roller slot mechanism according to claim 1, wherein the slot comprises a first closed end and a second open end.

8. The roller slot mechanism according to claim 1, wherein each of the input and output cranks are coupled to the landing gear bay at at least one connection point.

9. The roller slot mechanism according to claim 1, wherein the connecting means and the slot are in continual engagement with each other.

10. An apparatus for opening and closing a door of a landing gear bay in an aircraft comprising:

mechanical coupling means coupling the landing gear and the door, the coupling means comprising:

a drive rod coupled to the landing gear and a door rod coupled to the landing gear bay door;

an input crank coupled at a first end to the drive rod, opposite the end of the drive rod that is coupled to the landing gear; and an output crank, coupled at a first end to the door rod;

the input crank and the output crank independently pivotably coupled to the landing gear bay and further coupled to each other and configured so that pivotal movement of the input crank results in pivotal movement of the output crank thereby providing for the opening and closing of the bay door, wherein the input crank comprises one of a projection and a roller and the output crank comprises a slot, one of the projection and roller being sized to be received within the slot of the output crank and configured to move along a length of the slot upon pivotal movement of the input crank to cause the output crank to rotate, and wherein initial extension of the aircraft landing gear causes the mechanical coupling to move the landing gear bay door to an open position, extension of the aircraft landing gear past the landing gear bay door allows the mechanical coupling to maintain the landing gear bay door in the open position to allow the aircraft landing gear to pass, and approaching full extension of the aircraft landing gear causes the mechanical coupling to move the landing gear bay door to a closed position.

11. The apparatus according to claim 10, wherein the input crank is pivotably connected to the drive rod and movement of the drive rod, upon retraction or extension of the landing gear, pivots the input crank about the connection point.

12. An aircraft landing gear bay door opening and closing apparatus comprising:
a drive rod pivotably connected to the landing gear;
a door rod coupled to the landing gear bay door;
an input crank pivotably connected, at a first end, to the drive rod and coupled to the landing bay about an input crank pivot point;
an output crank pivotably connected to the door rod and coupled to the landing bay about an output crank pivot point;
at least one of the input and the output crank having at least one projection located thereon, the other of the input and output crank having an aperture configured to receive the projection within, the at least one projection and aperture configured to connect the input and output cranks so that the projection is configured to move within the aperture upon pivotal movement of the input crank to cause the output crank to rotate to open and close the landing gear bay door, and wherein initial extension of the landing gear initiates movement of the landing gear bay door to an open position, extension of the landing gear past the landing gear bay door maintains the landing gear bay door in the open position to allow the landing gear to pass, and approaching full extension of the landing gear initiates movement of the landing gear bay door to a closed position.

13. The apparatus according to claim 12, wherein the at least one projection is located on the input crank and the aperture is located on the output crank.

14. The apparatus according to claim 12, wherein the at least one projection comprises a roller, located on the input crank, configured to be received within the aperture located on the output crank opposite the end that is coupled to the landing gear.

15. The apparatus according to claim 14, wherein the aperture is a slot.

16. The roller slot mechanism according to claim 1, wherein initial extension of the aircraft landing gear causes the drive rod to provide rotational movement to the input crank to move the connecting means within the slot to cause amplified rotation of the output crank to cause the door rod to move the landing gear bay door to the open position.

17. The apparatus according to claim 10, wherein initial extension of the aircraft landing gear causes the drive rod to provide rotational movement to the input crank to move one of the projection and roller within the slot to cause amplified rotation of the output crank to cause the door rod to move the landing gear bay door to the open position.

18. The apparatus according to claim 12, wherein initial extension of the aircraft landing gear causes the drive rod to provide rotational movement to the input crank to move the projection within the aperture to cause amplified rotation of the output crank to be cause the door rod to move the landing gear bay door to the open position.

19. The roller slot mechanism according to claim 1, wherein retraction of the aircraft landing gear causes movement of the landing gear bay door to occur in reverse to movement of the landing gear bay door during extension of the landing gear.

20. The roller slot mechanism according to claim 1, wherein the slot has an arced portion that is concentric with the pivotal coupling of the input crank to maintain the landing gear bay door in the open position during extension of the aircraft landing gear past the landing gear bay door.

* * * * *